(12) United States Patent
Yu et al.

(10) Patent No.: US 10,872,439 B2
(45) Date of Patent: Dec. 22, 2020

(54) METHOD AND DEVICE FOR VERIFICATION

(71) Applicant: ArcSoft Corporation Limited, Hangzhou (CN)

(72) Inventors: Li Yu, Shanghai (CN); Menghan Liu, Shanghai (CN); Wang Miao, Shanghai (CN)

(73) Assignee: ArcSoft Corporation Limited, Hangzhou (CN)

( * ) Notice: Subject to any disclaimer, the term of this patent is extended or adjusted under 35 U.S.C. 154(b) by 104 days.

(21) Appl. No.: 16/176,652

(22) Filed: Oct. 31, 2018

(65) Prior Publication Data

US 2019/0130605 A1    May 2, 2019

(30) Foreign Application Priority Data

Nov. 1, 2017   (CN) .......................... 2017 1 1060090

(51) Int. Cl.
  *G06T 7/80*   (2017.01)
  *G06T 7/55*   (2017.01)

(52) U.S. Cl.
  CPC .................. *G06T 7/85* (2017.01); *G06T 7/55* (2017.01); *G06T 2207/10024* (2013.01); *G06T 2207/10028* (2013.01); *G06T 2207/10048* (2013.01)

(58) Field of Classification Search
  CPC . G06T 2207/10024; G06T 2207/10028; G06T 2207/10052; G06T 2207/20024; G06T 2207/20221; G06T 7/521; G06T 7/536; G06T 7/557; G06T 7/593; G06T 7/77; G06T 7/85; G06T 7/55; G06T 2207/10048
  See application file for complete search history.

(56) References Cited

U.S. PATENT DOCUMENTS

| 2017/0316602 | A1* | 11/2017 | Smirnov | G06T 5/50 |
| 2018/0246529 | A1* | 8/2018 | Hu | B64C 39/024 |
| 2019/0094981 | A1* | 3/2019 | Bradski | G02B 30/26 |

* cited by examiner

*Primary Examiner* — Diane D Mizrahi
(74) *Attorney, Agent, or Firm* — Osha Bergman Watanabe & Burton LLP

(57) ABSTRACT

The present invention provides a method and a device for verification applied to the field of image processing. The method includes: acquiring a common two-dimensional image, an infrared image and a depth map of a calibration object, wherein the calibration object carries a first pattern; calculating coordinates of an image formed on the infrared image by the first pattern, acquiring a depth value of the first pattern according to the depth map, and calculating a position of a projection formed on the common two-dimensional image by a three-dimensional point cloud corresponding to the image formed on the infrared image by the first pattern, and calculating a distance between an image and the projection formed on the common two-dimensional image by the first pattern. The method and device for verification provided by the present invention can verify a calibration parameter obtained after calibration performed by a depth camera device, enhancing calibration accuracy.

20 Claims, 8 Drawing Sheets

METHOD AND DEVICE FOR VERIFICATION

CROSS-REFERENCE TO RELATED APPLICATIONS

This application claims priority to Chinese Patent Application No. 201711060090.3, filed on Nov. 1, 2017, which is hereby incorporated by reference in its entirety.

BACKGROUND OF THE INVENTION

Field of the Invention

The present invention relates to a method and a device for image processing, and more particularly to a method and a device for verification.

Description of the Prior Art

With current rapid development of industries such as robots and artificial intelligence, two-dimensional image information is no longer satisfactory and depth visual requirements are ever-increasingly emphasized. A depth camera can real-time acquire three-dimensional values and depth information of an object in an ambient environment to more truly restore the world observed by the human eye and thus bring a user with more natural and realistically experience. A current depth camera is frequently applied in fields such as simultaneous localization and mapping (SLAM), immersive interaction, unmanned driving, three-dimensional reconstruction, gesture recognition and three-dimensional human face recognition.

However, the prior art lacks a method and a device for verifying a calibration parameter obtained after calibration is performed on a depth camera device.

SUMMARY OF THE INVENTION

A method and a device for verification provided by the present invention can resolve the issue of the prior art that lacks a method and a device for verifying a calibration parameter obtained after calibration is performed on a depth camera device.

A method for verification is provided according to a first aspect of the present invention. The method includes: acquiring a common two-dimensional image, an infrared image and a depth map of a calibration object, wherein the calibration object carries a first pattern; and calculating, according to the infrared image, coordinates of an image formed on the infrared image by the first pattern, acquiring a depth value of the first pattern according to the depth map, calculating, according to a parameter obtained from calibration, the coordinates of the image formed on the infrared image by the first pattern and the depth value of the first pattern, a position of a projection formed on the common two-dimensional image by a three-dimensional point cloud corresponding to the image formed on the infrared image by the first pattern, and calculating a distance between an image and the projection formed on the common two-dimensional image by the first pattern; or, calculating, according to the common two-dimensional image, coordinates of an image formed on the common two-dimensional image by the first pattern, acquiring the depth value of the first pattern according to the depth map, calculating, according to the parameter obtained from calibration, the coordinates of the image formed on the common two-dimensional image by the first pattern and the depth value of the first pattern, a position of a projection formed on the infrared image by a three-dimensional point cloud corresponding to the image formed on the common two-dimensional image by the first pattern, and calculating a distance between an image and the projection formed on the infrared image by the first pattern.

According to the first aspect of the present invention, in a first executable method of the first aspect of the present invention, the method further includes: determining a verification result according to the distance and a first threshold.

According to the first aspect of the present invention or the first executable method of the first aspect of the present invention, in a second executable method of the first aspect of the present invention, the calibration object includes at least three equal-sized calibration boards, wherein the first patterns carried by the at least three calibration boards are identical; the first pattern includes first circular points or first ellipsoidal points distributed on the calibration board, and a difference between grayscale values of the first circular points or the first ellipsoidal points and a background of the calibration board is greater than the first threshold.

According to the second executable method of the first aspect of the present invention, in a third executable method of the first aspect of the present invention, the first circular points or the first ellipsoidal points are evenly distributed in rows and columns on the calibration board.

According to the second executable method or the third executable method of the first aspect of the present invention, in a fourth executable method of the first aspect of the present invention, the coordinates of the image formed on the infrared image by the first pattern includes coordinates of centers of the first circular points or the first ellipsoidal points in the infrared image; the distance between the image and the projection formed on the common two-dimensional image by the first pattern includes a distance between a position of the projection formed on the common two-dimensional image by the centers of the first circular points or the first ellipsoidal points in the infrared image and a position of the image formed on the common two-dimensional image by the centers of the first circular points or the first ellipsoidal points.

According to any executable method of the first executable method to the fourth executable method of the first aspect of the present invention, in a fifth executable method of the first aspect of the present invention, the coordinates of the first pattern in the common two-dimensional image correspond to the coordinates of the same first pattern in the infrared image.

According to any executable method of the second executable method to the fifth executable method of the first aspect of the present invention, in a sixth executable method of the first aspect of the present invention, the calibration object including the at least three equal-sized calibration boards includes four equal-sized calibration boards included in the calibration object, wherein the four calibration boards are arranged in two rows and two columns.

According to the first aspect of the present invention or any executable method of the first executable method to the sixth executable method of the first aspect of the present invention, in a seventh executable method of the first aspect of the present invention, the calibration object carries a pattern indicating a placement direction of the calibration object.

According to the seventh executable method of the first aspect of the present invention, in an eighth executable method of the first aspect of the present invention, the pattern indicating the placement direction of the calibration object includes one of: a first number of second circular points arranged in one row and a second number of second circular points arranged in another row; and the first number of second circular points arranged in one column, and the second number of second circular points arranged in another column; wherein, the second circular points are arranged so as to form a pattern indicating the placement direction of the calibration object.

According to the first aspect of the present invention, or any one of the first executable method to the eighth executable method of the first aspect of the present invention, in a ninth executable method of the first aspect of the present invention, the common two-dimensional image is captured by a first camera device, the infrared image is captured by a second camera device, and the first camera device and the second camera device have different fields of view.

According to the ninth executable method of the first aspect of the present invention, in a tenth executable method of the first aspect of the present invention, an image captured by, between the first camera device and the second camera device, the camera device having a greater field of view includes an image of the entire calibration object; the image of the calibration object occupies a middle part of the common two-dimensional image, and occupies more than a first ratio of the common two-dimensional image; the image of the calibration object occupies a middle part of the infrared image, and occupies more than the first ratio of the infrared image.

According to the tenth executable method of the first aspect of the present invention, in an eleventh executable method of the first aspect of the present invention, the first ratio is 80%.

According to the first aspect of the present invention, or any one of the first executable method to the eleventh executable method of the first aspect of the present invention, in a twelfth executable method of the first aspect of the present invention, the step of acquiring the common two-dimensional image and the infrared image of the calibration object includes: simultaneously capturing one common two-dimensional image and one infrared image of the calibration object.

According to the first aspect of the present invention, or any one of the first executable method to the twelfth executable method of the first aspect of the present invention, in a thirteenth executable method of the first aspect of the present invention, the step of calculating, according to the parameter obtained from calibration, the coordinates of the image formed on the infrared image by the first pattern, and the depth value of the first pattern, the position of the projection formed on the common two-dimensional image by the three-dimensional point cloud corresponding to the image formed on the infrared image by the first pattern includes: calculating, according to the coordinates of the image formed on the infrared image by the first pattern, the depth value of the first pattern, and a focal length, principal-point coordinates and a skew factor of the second camera device and obtained from calibration, a position of a point cloud in a three-dimensional coordinate system of the second camera device and mapped from the first pattern, wherein the common two-dimensional image is captured by the first camera device and the infrared image is captured by the second camera device; calculating, according to a relative rotation matrix and a relative translation matrix between the first camera device and the second camera device and obtained from calibration, a position of a point cloud in a three-dimensional coordinate system of the first camera device and mapped from the position of the point cloud of the first pattern in the three-dimensional coordinate system of the second camera device; and calculating, according to a focal length, principal-point coordinates and a skew factor of the first camera device and obtained from calibration, a position of a projection in a two-dimensional coordinate system of the common two-dimensional image and mapped from the point cloud of the first pattern in the three-dimensional coordinate system of the first camera device.

According to the first aspect of the present invention, or any one of the first executable method to the thirteenth executable method of the first aspect of the present invention, in a fourteenth executable method of the first aspect of the present invention, the step of calculating, according to the parameter obtained from calibration, the coordinates of the image formed on the common two-dimensional image by the first pattern, and the depth value of the first pattern, the position of the projection formed on the infrared image by the three-dimensional point cloud corresponding to the image formed on the common two-dimensional image by the first pattern includes: calculating, according to the coordinates of the image formed on the common two-dimensional image by the first pattern, the depth value of the first pattern, and the focal length, the principal-point coordinates and the skew factor of the first camera device and obtained from calibration, the position of the point cloud in the three-dimensional coordinate system of the first camera device and mapped from the first pattern, wherein the common two-dimensional image is captured by the first camera device and the infrared image is captured by the second camera device; calculating, according to the relative rotation matrix and the relative translation matrix between the first camera device and the second camera device and obtained from calibration, the position of the point cloud in the three-dimensional coordinate system of the second camera device and mapped from the position of the point cloud of the first pattern in the three-dimensional coordinate system of the first camera device; and calculating, according to the focal length, the principal-point coordinates and the skew factor of the second camera device and obtained from calibration, the position of the projection in the two-dimensional coordinate system of the common two-dimensional image and mapped from the point cloud of the first pattern in the three-dimensional coordinate system of the first camera device.

According to the first aspect of the present invention, or any one of the first executable method to the fourteenth executable method of the first aspect of the present invention, in a fifteenth executable method of the first aspect of the present invention, the common two-dimensional image includes a black-and-white image or a color image.

A system for verification is provided according to a second aspect of the present invention. The system includes a calibration object, a first camera device, a second camera device and a first processor. The first camera device is for capturing a common two-dimensional image of the calibration object, wherein the calibration object carries a first pattern. The second camera device is for capturing an infrared image of the calibration object. The first processor is for calculating a depth map of the calibration object according to the second camera device. The first processor is further for: calculating, according to the infrared image, coordinates of an image formed on the infrared image by the first pattern, acquiring a depth value of the first pattern according to the depth map, calculating, according to a parameter obtained from calibration, the coordinates of the image formed on the infrared image by the first pattern, and the depth value of the first pattern, a position of a projection formed on the common two-dimensional image by a three-dimensional point cloud corresponding to the image formed on the infrared image by the first pattern, and calculating a distance between an image and the projection formed on the common two-dimensional image by the first pattern; or, calculating, according to the common two-dimensional image, coordinates of an image formed on the common two-dimensional image by the first pattern, acquiring the depth value of the first pattern according to the depth map, calculating, according to the parameter obtained from calibration, the coordinates of the image formed on the common two-dimensional image by the first pattern, and the depth value of the first pattern, a position of a projection formed on the infrared image by a three-dimensional point cloud corresponding to the image formed on the common two-dimensional image by the first pattern, and calculating a distance between an image and the projection formed on the infrared image by the first pattern.

According to a second aspect of the present invention, in a first executable method of the second aspect of the present invention, the first processor is further for determining a verification result according to the distance and a first threshold.

According to the second aspect or the first executable method of the second aspect of the present invention, in a second executable method of the second aspect of the present invention, the calibration object includes at least three equal-sized calibration boards, wherein the first patterns carried by the at least three calibration boards are identical. The first pattern includes first circular points or first ellipsoidal points distributed on the calibration board, and a difference between grayscale values of the first circular points or the first ellipsoidal points and a background of the calibration board is greater than the first threshold.

According to the second executable method of the second aspect of the present invention, in a third executable method of the second aspect of the present invention, the first circular points or the first ellipsoidal points are evenly distributed in rows and columns on the calibration board.

According to the second executable method or the third executable method of the second aspect of the present invention, in a fourth executable method of the second aspect of the present invention, the coordinates of the image formed on the infrared image by the first pattern include: coordinates of centers of the first circular points or the first ellipsoidal points in the infrared image; the distance between the image and the projection formed on the common two-dimensional image by the first pattern includes a distance between a position of a projection formed on the common two-dimensional image by the centers of the first circular points or the first ellipsoidal points in the infrared image and a position of an image formed on the common two-dimensional image by the centers of the first circular points or the first ellipsoidal points.

According to the second aspect of the present invention, or any one of the first executable method to the fourth executable method of the second aspect of the present invention, in a fifth executable method of the second aspect of the present invention, the coordinates of the first pattern in the common two-dimensional image correspond to the coordinates of the same first pattern in the infrared image.

According any one of the second executable method to the fifth executable method of the second aspect of the present invention, in a sixth executable method of the second aspect of the present invention, the calibration object including the at least three equal-sized calibration boards includes: four equal-sized calibration boards included in the calibration object, wherein the four calibration boards are arranged in two rows and two columns.

According to the second aspect of the present invention, or any one of the first executable method to the sixth executable method of the second aspect of the present invention, in a seventh executable method of the second aspect of the present invention, the calibration object carries a pattern indicating a placement direction of the calibration object.

According to the seventh executable method of the second aspect of the present invention, in an eighth executable method of the second aspect of the present invention, the pattern indicating the placement direction of the calibration object includes one of: a first number of second circular points arranged in one row and a second number of second circular points arranged in another row; and the first number of second circular points arranged in one column, and the second number of second circular points arranged in another column; wherein, the second circular points are arranged so as to form a pattern indicating the placement direction of the calibration object.

According to the second aspect of the present invention, or any one of the first executable method to the eighth executable method of the second aspect of the present invention, in a ninth executable method of the second aspect of the present invention, the common two-dimensional image is captured by a first camera device, the infrared image is captured by a second camera device, and the first camera device and the second camera device have different fields of view.

According to the ninth executable method of the second aspect of the present invention, in a tenth executable method of the second aspect of the present invention, an image captured by, between the first camera device and the second camera device, the camera device having a greater field of view includes an image of the entire calibration object; the image of the calibration object occupies a middle part of the common two-dimensional image, and occupies more than a first ratio of the common two-dimensional image; the image of the calibration object occupies a middle part of the infrared image, and occupies more than the first ratio of the infrared image.

According to the tenth executable method of the second aspect of the present invention, in an eleventh executable method of the second aspect of the present invention, the first ratio is 80%.

According to the second aspect of the present invention, or any one of the first executable method to the eleventh executable method of the second aspect of the present invention, in a twelfth executable method of the second aspect of the present invention, the first camera device and the second camera device are specifically for simultaneously capturing one common two-dimensional image and one infrared image of the calibration object.

According to the second aspect of the present invention, or any one of the first executable method to the twelfth executable method of the second aspect of the present invention, in a thirteen executable method of the second aspect of the present invention, the first processor is specifically for: calculating, according to the coordinates of the image formed on the infrared image by the first pattern, the depth value of the first pattern, and a focal length, principal-point coordinates and a skew factor of the second camera device and obtained from calibration, a position of the point cloud in a three-dimensional coordinate system of the second camera device and mapped from the first pattern, wherein the common two-dimensional image is captured by the first camera device and the infrared image is captured by the second camera device; calculating, according to a relative rotation matrix and a relative translation matrix between the first camera device and the second camera device and obtained from calibration, a position of a point cloud in a three-dimensional coordinate system of the first camera device and mapped from the position of the point cloud of the first pattern in the three-dimensional coordinate system of the second camera device; and calculating, according to a focal length, principal-point coordinates and a skew factor of the first camera device and obtained from calibration, a position of a projection in a two-dimensional coordinate system of the common two-dimensional image and mapped from the point cloud of the first pattern in the three-dimensional coordinate system of the first camera device.

According to the second aspect of the present invention, or any one of the first executable method to the thirteenth executable method of the second aspect of the present invention, in a fourteenth executable method of the second aspect of the present invention, the first processor is specifically for: calculating, according to the coordinates of the image formed on the common two-dimensional image by the first pattern, the depth value of the first pattern, and the focal length, the principal-point coordinates and the skew factor of the first camera device and obtained from calibration, a position of the point cloud in the three-dimensional coordinate system of the first camera device and mapped from the first pattern, wherein the common two-dimensional image is captured by the first camera device and the infrared image is captured by the second camera device; calculating, according to the relative rotation matrix and the relative translation matrix between the first camera device and the second camera device and obtained from calibration, the position of the point cloud in the three-dimensional coordinate system of the second camera device and mapped from the position of the point cloud of the first pattern in the three-dimensional coordinate system of the first camera device; and calculating, according to the focal length, the principal-point coordinates and the skew factor of the second camera device and obtained from calibration, the position of the projection in the two-dimensional coordinate system of the common two-dimensional image and mapped from the point cloud of the first pattern in the three-dimensional coordinate system of the first camera device.

According to the second aspect of the present invention, or any one of the first executable method to the fourteenth executable method of the second aspect of the present invention, in a fifteenth executable method of the second aspect of the present invention, the common two-dimensional image includes a black-and-white image or a color image.

A device for verification is provided according to a third aspect of the present invention. The device includes: a receiving module, for acquiring a common two-dimensional image, an infrared image and a depth map of a calibration object, wherein the calibration object carries a first pattern; and a second processor, for calculating, according to the infrared image, coordinates of an image formed on the infrared image by the first pattern, acquiring a depth value of the first pattern according to the depth map, calculating, according to a parameter obtained from calibration, the coordinates of the image formed on the infrared image by the first pattern, and the depth value of the first pattern, a position of a projection formed on the common two-dimensional image by a three-dimensional point cloud corresponding to the image formed on the infrared image by the first pattern, and calculating a distance between an image and the projection formed on the common two-dimensional image by the first pattern; or, calculating, according to the common two-dimensional image, coordinates of an image formed on the common two-dimensional image by the first pattern, acquiring the depth value of the first pattern according to the depth map, calculating, according to the parameter obtained from calibration, the coordinates of the image formed on the common two-dimensional image by the first pattern, and the depth value of the first pattern, a position of a projection formed on the infrared image by a three-dimensional point cloud corresponding to the image formed on the common two-dimensional image by the first pattern, and calculating a distance between an image and the projection formed on the infrared image.

According to the third aspect of the present invention, in a first executable method of the third aspect of the present invention, the second processor is further for determining a verification result according to the distance and a first threshold.

According to the third aspect or the first executable method of the third aspect of the present invention, in a second executable method of the third aspect of the present invention, the calibration object includes at least three equal-sized calibration boards, wherein the first patterns carried by the at least three calibration boards are identical; the first pattern includes first circular points or first ellipsoidal points distributed on the calibration board, and a difference between grayscale values of the first circular points or the first ellipsoidal points and a background of the calibration board is greater than the first threshold.

According to the second executable method of the third aspect of the present invention, in a third executable method of the third aspect of the present invention, the first circular points or the first ellipsoidal points are evenly distributed in rows and columns on the calibration board.

According to the second executable method or the third executable method of the third aspect of the present invention, in a fourth executable method of the third aspect of the present invention, the coordinates of the image formed on the infrared image by the first pattern includes coordinates of centers of the first circular points or the first ellipsoidal points in the infrared image; the distance between the image and the projection formed on the common two-dimensional image by the first pattern includes a distance between a position of a projection formed on the common two-dimensional image by the centers of the first circular points or the first ellipsoidal points in the infrared image and a position of an image formed on the common two-dimensional image by the centers of the first circular points or the first ellipsoidal points.

According to the third aspect of the present invention, or any one of the first executable method to the fourth executable method of the third aspect of the present invention, in a fifth executable method of the third aspect of the present invention, the coordinates of the first pattern in the common two-dimensional image correspond to coordinates of the same first pattern in the infrared image.

According to the third aspect of the present invention, or any one of the second executable method to the fifth executable method of the third aspect of the present invention, in a sixth executable method of the third aspect of the present invention, the calibration object including the at least three equal-sized calibration boards includes: four equal-sized calibration boards included in the calibration object, wherein the four calibration boards are arranged in two rows and two columns.

According to the third aspect of the present invention, or any one of the first executable method to the sixth executable method of the third aspect of the present invention, in a seventh executable method of the third aspect of the present invention, the calibration object carries a pattern indicating a placement direction of the calibration object.

According to the seventh executable method of the third aspect of the present invention, in an eighth executable method of the third aspect of the present invention, the pattern indicating the placement direction of the calibration object includes one of: a first number of second circular points arranged in one row and a second number of second circular points arranged in another row; and the first number of second circular points arranged in one column, and the second number of second circular points arranged in another column; wherein, the second circular points are arranged so as to form a pattern indicating the placement direction of the calibration object.

According to the third aspect of the present invention, or any one of the first executable method to the eighth executable method of the third aspect of the present invention, in a ninth executable method of the third aspect of the present invention, the common two-dimensional image is captured by a first camera device, the infrared image is captured by a second camera device, and the first camera device and the second camera device have different fields of view.

According to the ninth executable method of the third aspect of the present invention, in a tenth executable method of the third aspect of the present invention, an image captured by, between the first camera device and the second camera device, the camera device having a greater field of view includes an image of the entire calibration object; the image of the calibration object occupies a middle part of the common two-dimensional image, and occupies more than a first ratio of the common two-dimensional image; the image of the calibration object occupies a middle part of the infrared image, and occupies more than the first ratio of the infrared image.

According to the tenth executable method of the third aspect of the present invention, in an eleventh executable method of the third aspect of the present invention, the first ratio is 80%.

According to the third aspect of the present invention, or any one of the first executable method to the eleventh executable method of the third aspect of the present invention, in a twelfth executable method of the third aspect of the present invention, the second processor is specifically for acquiring one common two-dimensional image and one infrared image of the calibration object simultaneously captured by the first camera device and the second camera device.

According to the third aspect of the present invention, or any one of the first executable method to the twelfth executable method of the third aspect of the present invention, in a thirteenth executable method of the third aspect of the present invention, the second processor is specifically for: calculating, according to the coordinates of the image formed on the infrared image by the first pattern, the depth value of the first pattern, and a focal length, principal-point coordinates and a skew factor of the second camera device and obtained from calibration, a position of a point cloud in a three-dimensional coordinate system of the second camera device and mapped from the first pattern, wherein the common two-dimensional image is captured by the first camera device and the infrared image is captured by the second camera device; calculating, according to a relative rotation matrix and a relative translation matrix between the first camera device and the second camera device and obtained from calibration, a position of the point cloud in a three-dimensional coordinate system of the first camera device and mapped from the position of the point cloud of the first pattern in the three-dimensional coordinate system of the second camera device; and calculating, according to a focal length, principal-point coordinates and a skew factor of the first camera device and obtained from calibration, a position of a projection in a two-dimensional coordinate system of the common two-dimensional system and mapped from the point cloud of the first pattern in the three-dimensional coordinate system of the first camera device.

According to the third aspect of the present invention, or any one of the first executable method to the thirteenth executable method of the third aspect of the present invention, in a fourteenth executable method of the third aspect of the present invention, the second processor is specifically for: calculating, according to the coordinates of the image formed on the common two-dimensional image by the first pattern, the depth value of the first pattern, and the focal length, the principal-point coordinates and the skew factor of the first camera device and obtained from calibration, a position of a cloud point in a three-dimensional coordinate system of the first camera device and mapped from the first pattern, wherein the common two-dimensional image is captured by the first camera device and the infrared image is captured by the second camera device; calculating, according to the relative rotation matrix and the relative translation matrix between the first camera device and the second camera device and obtained from calibration, the position of the point cloud in the three-dimensional coordinate system of the second camera device and mapped from the position of the point cloud of the first pattern in the three-dimensional coordinate system of the first camera device; and calculating, according to the focal length, the principal-point coordinates and the skew factor of the second camera device and obtained from calibration, the position of the projection in the two-dimensional coordinate system of the common two-dimensional image and mapped from the point cloud of the first pattern in the three-dimensional coordinate system of the first camera device.

According to the third aspect of the present invention, or any one of the first executable method to the fourteenth executable method of the third aspect of the present invention, in a fifteenth executable method of the third aspect of the present invention, the common two-dimensional image includes a black-and-white image or a color image.

A computer-readable storage medium is provided according to a fifth aspect of the present invention. The computer-readable storage medium stores a computer program. When executed by a third processor, the computer program realizes the steps of the method of the first aspect of the present invention, any executable method of the first executable method of the first aspect of the present invention to the fifteenth executable method of the first aspect of the present invention.

A device for verification is provided according to a sixth aspect of the present invention. The device includes a memory, a fourth processor, and a computer program that is stored in the memory and can be run by the fourth processor. When executed by the fourth processor, the computer program realizes the steps of the method of the first aspect of the present invention, any one executable method of the first executable method of the first aspect of the present invention to the fifteenth executable method of the first aspect of the present invention.

The method and device for verification provided by the present invention can verify a calibration parameter acquired after calibration is performed on a depth camera device, enhancing calibration accuracy.

DETAILED DESCRIPTION OF THE EMBODIMENTS

Figure 1:
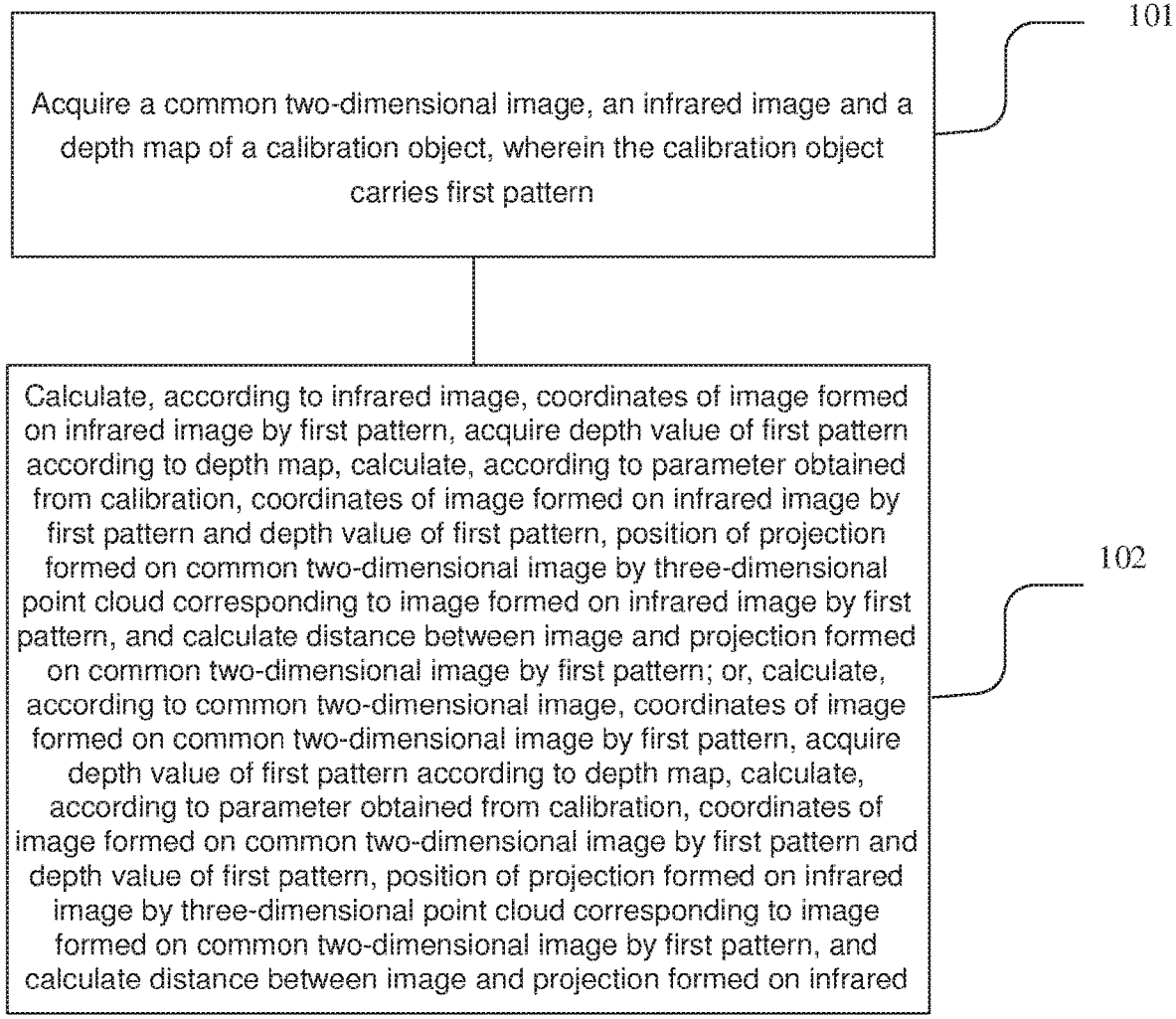
FIG. 1 is a flowchart of a method for verification provided according to a first embodiment of the present invention.

Details of the technical solutions of the present invention are given in the embodiments of the present invention with the accompanying drawings below.

The terms "first" and "second" in the description and claims of the present invention are for distinguishing different objects rather than limiting a specific order.

The term "and/or" in the embodiments of the present invention merely describes an association relationship of associated objects, and represents three possible relationship, for example, A and/or B can represent that A exists independently, A and B exist simultaneously, and B exists independently.

In the embodiments of the present invention, terms such as "illustrative" or "exemplary" represent examples, instances or illustrations. Any embodiment or design solution described as "illustrative" or "exemplary" should not be interpreted as being more preferred or more advantageous over other embodiments or design solutions. More specifically, the use of terms such as "illustrative" or "exemplary" is specifically for presenting associated concepts.

It should be noted that, for clarity and brevity of the drawings, elements in the drawings are not necessarily drawn to actual scales. For example, for clarity, size of certain elements can be enlarged compared to other elements. Further, when appropriate, denotations can be repeated in the drawings to indicate corresponding or similar elements.

The method and the device for verification described in the present invention can be used for verifying a calibration result of a camera device group, for example, applicable to a camera device group consisting of a camera device for capturing a common two-dimensional image and a camera device for capturing an infrared image; for example, a camera device group for measuring depth, and the camera device group for measuring depth can be a structured light type, a time-of-flight (TOF) type or a binocular stereo imaging type. The above camera device group for measuring depth can be installed to a camera, a cell phone or a tablet computer. The structured light type camera device group for measuring depth may include an infrared transmitter, an infrared camera device and an RGB camera device; the TOF type camera device group for measuring depth may include an infrared transmitter, an infrared camera and an RGB camera assembly; the binocular stereo imaging type camera group for measuring depth may include an infrared transmitter, two infrared camera devices and an RGB camera device.

A method for verification provided according to a first embodiment of the present invention is described in detail with reference to FIG. 1 below. As shown in FIG. 1, the method includes the following steps.

In step 101, a common two-dimensional image, an infrared image and a depth map of a calibration object are acquired, wherein the calibration object carries a pattern.

The common two-dimensional image may be captured by a first camera device, and the infrared image may be captured by a second camera device. The common two-dimensional image includes a black-and-white image or a color image, and the color image may be a red/green/blue (RGB) image.

Selectively, the step of acquiring may be acquiring from a storage device, and the storage device may be a random-access memory (RAM) or a flash memory.

Selectively, the step of acquiring the common two-dimensional image and the infrared image of the calibration object may include: simultaneously capturing one common two-dimensional image and one infrared image of the calibration object. It should be noted that, the term "simultaneously" does not strictly mean the same moment, and may be approximately the same time; that is, compared to the prior art in which a first camera device and a second camera device are required to respectively sequentially capture the calibration object, the first camera device and the second camera device of the present invention are not required to respectively sequentially capture the calibration object, thus enhancing the calibration efficiency.

Selectively, the calibration object includes at least three equal-sized calibration boards, wherein the first patterns carried by the at least three calibration boards are identical, the first pattern includes first circular points or first ellipsoidal points distributed on the calibration board, and a difference between grayscale values of the first circular points or the first ellipsoidal points and a background of the calibration board is greater than a first threshold. Selectively, when the calibration object includes three equal-sized calibration boards, the three equal-sized calibration boards may be arranged at positions forming an upright triangle, that is, one of the three equal-sized calibration boards is arranged right above the middle of the two other calibration boards arranged side by side below. Selectively, the first threshold is 80. For example, the first circular points or the first ellipsoidal points are black with a grayscale value of less than 100, and the background of the calibration board can be white with a grayscale value of more than 180. Selectively, a long side of the calibration board is parallel to the first camera device and the second camera device.

Figure 2:
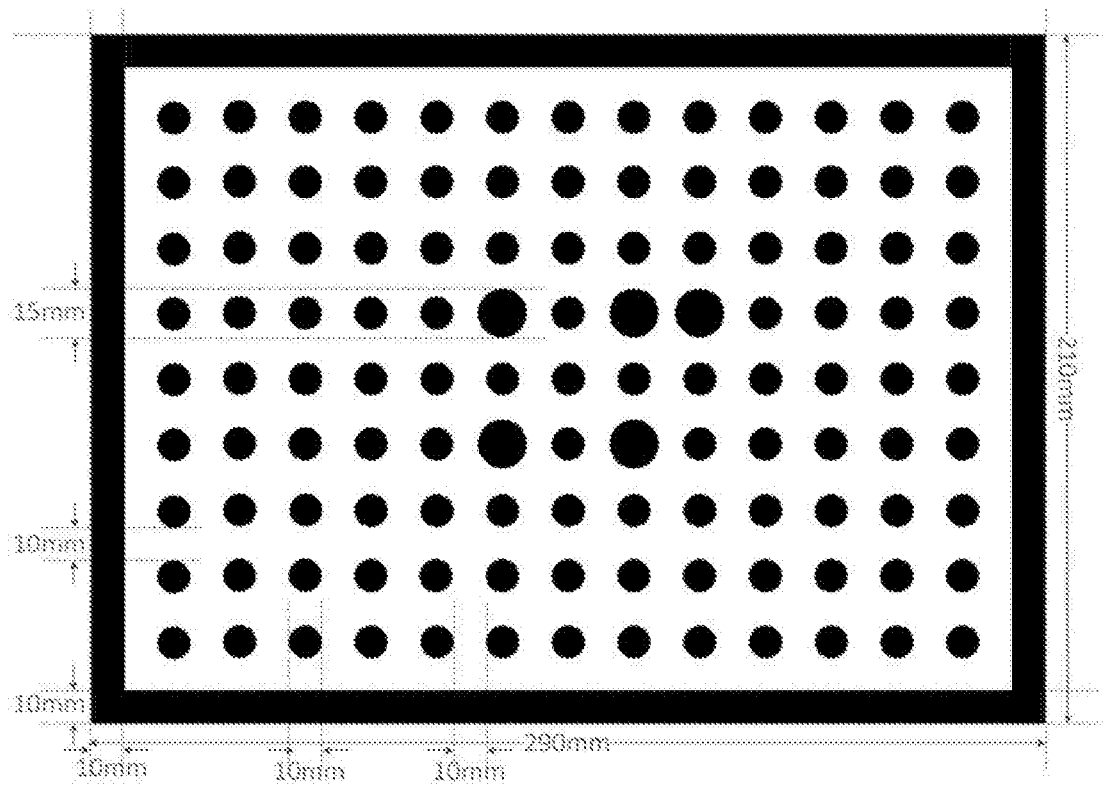
FIG. 2 is a schematic diagram of a calibration board provided according to the first embodiment of the present invention.

Selectively, the first circular points and or the first ellipsoidal points are evenly distributed in rows and columns on the calibration board, as shown in FIG. 2. Selectively, a calibration image on the calibration board may have a frame, which may be black. Selectively, the calibration image has a length of 290 mm and a width of 210 mm. In FIG. 2, the first pattern are small circular points having a diameter of 10 mm, and a distance between the small circular points is 10 mm. The black frame in the calibration image has a width of 10 mm. In the calibration image, there are 13 circular points on the long side, and 9 circular points on the short side.

Preferably, the calibration object includes four equal-sized calibration boards, which are arranged in two rows and two columns. The descriptive terms relating to positions, such as "parallel" and "middle" are approximate description rather than strict requirements, for example, approximately parallel.

Figure 3:
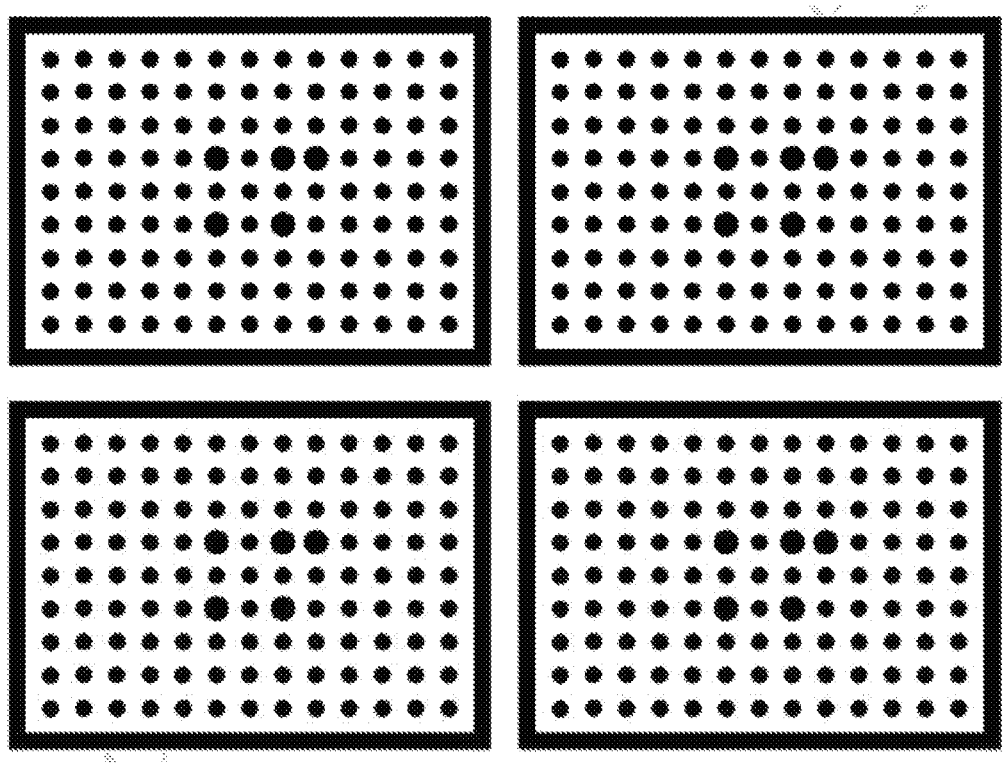
FIG. 3 is a schematic diagram of a formed image of a calibration board provided according to the first embodiment of the present invention.

Selectively, the calibration object carries a pattern indicating a placement direction of the calibration object. The pattern indicating the placement direction of the calibration object may include one of: a first number of second circular points arranged in one row and a second number of second circular points arranged in another row; and the first number of second circular points arranged in one column, and the second number of second circular points arranged in another column; wherein, the second circular points are arranged so as to form a pattern indicating the placement direction of the calibration object. The term "one row" refers to a certain row and does not represent an order in an arrangement. For example, as shown in FIG. 2 or FIG. 3, the term "one row" may be a fourth row from top to bottom in the arrangement, and the term "another row" may be a sixth row from top to bottom in the arrangement. As shown in FIG. 2 or FIG. 3, the second circular points are the large circular points in the drawing, and the large points may have a diameter of 15 mm. Selectively, the pattern indicating the placement direction of the calibration object as arranged by the second circular points may include: an arrow pattern or other equivalent patterns. Through the pattern indicating the placement direction of the calibration object, multiple calibration boards can be placed along the same direction.

Selectively, the first camera device and the second camera device have different fields of view. The method provided by the embodiment of the present invention can calibrate a camera device group consisting of at least two camera devices, and the fields of view of the at least two camera devices may be different.

Selectively, an image captured by, between the first camera device and the second camera device, the camera device having a greater field of view includes an image of the entire calibration object. The image of the calibration object occupies a middle part of the common two-dimensional image, and occupies more than a first ratio of the common two-dimensional image. The image of the calibration object occupies a middle part of the infrared image, and occupies more than the first ratio of the infrared image. Preferably, the first ratio may be 80%, and the first ratio may be appropriately reduced according to the calibration precision.

Figure 4:
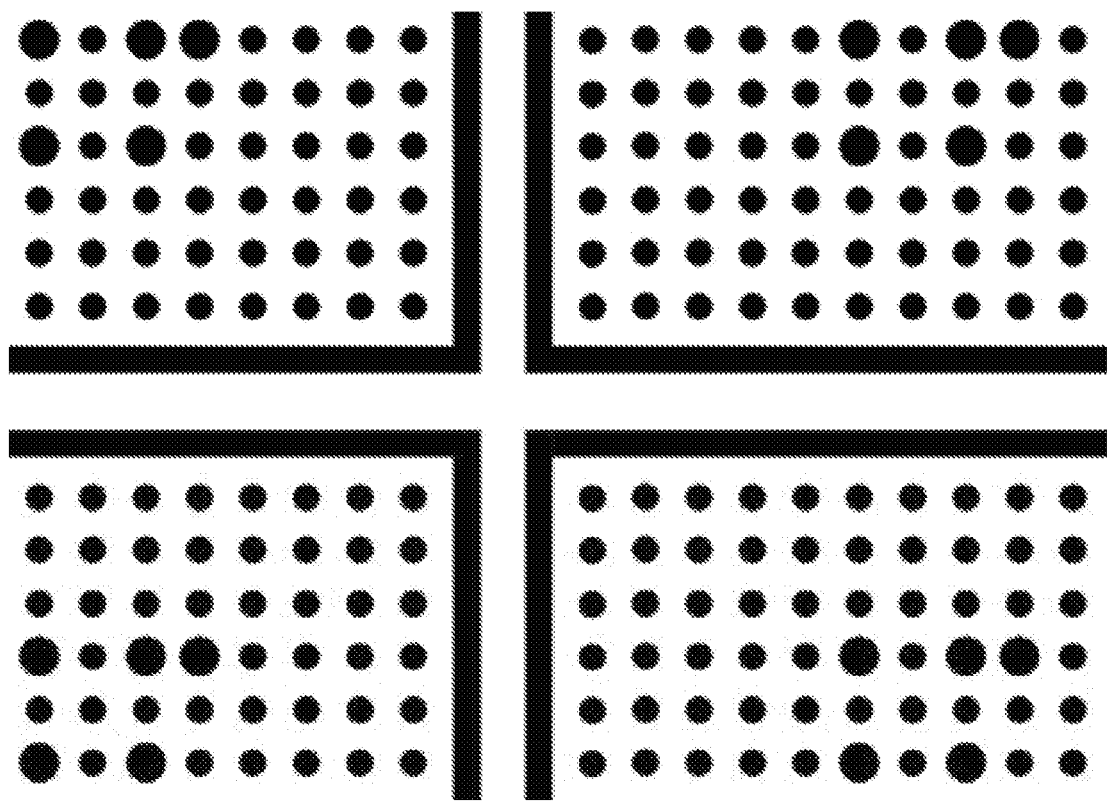
FIG. 4 is another schematic diagram of a formed image of a calibration board provided according to the first embodiment of the present invention.

Selectively, as shown in FIG. 4, the image of the calibration object occupies more than the first ratio of an image captured by, between the first camera device and the second camera device, the camera device having a smaller field of view. Preferably, the first ratio may be 80%, and the first ratio may be appropriately reduced according to the calibration precision.

Preferably, the coordinates of the first pattern in the common two-dimensional image correspond to the coordinates of the same first pattern in the infrared image. More specifically, a corresponding relationship needs to be established between the coordinates of the first pattern in the common two-dimensional image and the coordinates of the same first pattern in the infrared image. The method for establishing the corresponding relationship may be performed through sorting and storing the sequences of the acquired coordinates of the first pattern in the two types of two-dimensional images.

In step 102, coordinates of an image formed on the infrared image by the first pattern are calculated according to the infrared image, a depth value of the first pattern is acquired according to a depth map, a position of a projection formed on the common two-dimensional image by a three-dimensional point cloud corresponding to the image formed on the infrared image by the first pattern is calculated according to a parameter obtained from calibration, the coordinates of the image formed on the infrared image by the first pattern and the depth value of the first pattern, and a distance between an image and the projection formed on the common two-dimensional image by the first pattern is calculated; or, coordinates of an image formed on the common two-dimensional image by the first pattern are calculated according to the common two-dimensional image, the depth value of the first pattern is acquired according to the depth map, a position of a projection formed on the infrared image by a three-dimensional point cloud corresponding to the image formed on the common two-dimensional image by the first pattern is calculated according to the parameter obtained from calibration, the coordinates of the image formed on the common two-dimensional image by the first pattern and the depth value of the first pattern, and a distance between an image and the projection formed on the infrared image by the first pattern is calculated.

The method further includes determining a verification result according to the distance and the first threshold. The first threshold may be predetermined. Selectively, an average distance between all projection points and the image formed on the infrared image by the first pattern is calculated, and the verification is successful if the average distance is smaller than the above threshold, otherwise calibration needs to be performed again.

Selectively, the position of the image formed on the common two-dimensional image or the infrared image by the first pattern may be coordinates of centers of circles or ellipsoids. The coordinates of the image formed on the infrared image by the first pattern includes coordinates of the centers of the first circular points or the first ellipsoidal points in the infrared image; and the distance between the image and the projection formed on the common two-dimensional image by the first pattern includes a distance between a position of a projection formed on the common two-dimensional image by the centers of the first circular points or the first ellipsoidal points in the infrared image, and a position of an image formed on the common two-dimensional image by the centers of the first circular points or the first ellipsoidal points.

The step of calculating, according to the parameter obtained from calibration, the coordinates of the image formed on the infrared image by the first pattern and the depth value of the first pattern, the position of the projection formed on the common two-dimensional image by the three-dimensional point cloud corresponding to the image formed on the infrared image by the first pattern includes: calculating, according to the coordinates of the image formed on the infrared image by the first pattern, the depth value of the first pattern, and a focal length, principal-point coordinates and a skew factor of the second camera device and obtained from calibration, a position of a point cloud in a three-dimensional coordinate system of the second camera device and mapped from the first pattern, wherein the common two-dimensional image is captured by the first camera device and the infrared image is captured by the second camera device; calculating, according to a relative rotation matrix and a relative translation matrix between the first camera device and the second camera device and obtained from calibration, a position of a point cloud in a three-dimensional coordinate system of the first camera device and mapped from the position of the point cloud of the first pattern in the three-dimensional coordinate system of the second camera device; and calculating, according to a focal length of the first camera device, principal-point coordinates and a skew factor of the first camera device and obtained from calibration, a position of a projection in a two-dimensional coordinate system of the common two-dimensional image and mapped from the point cloud of the first pattern in the three-dimensional coordinate system of the first camera device.

More specifically, coordinates of the first pattern detected in the infrared image, that is, the centers of the circular points or the ellipsoidal points, are detected, and depth values of the coordinates of the centers is acquired according to the depth map. The centers are mapped to a three-dimensional coordinate system of the infrared camera device to form a point cloud. Preferably, to form the point cloud, coordinates of a point in the infrared image can be first corrected according to a distortion coefficient of the infrared camera device. In a normalized image coordinate system, a distortion model is as below:

$$r = \sqrt{x^2 + y^2}$$

$$\begin{bmatrix} x_d \\ y_d \end{bmatrix} = (1 + k_1 r^2 + k_2 r^4 + k_3 r^6) \begin{bmatrix} x \\ y \end{bmatrix} + \begin{bmatrix} 2p_1 xy + p_2(r^2 + 2x^2) \\ 2p_2 xy + p_1(r^2 + 2y^2) \end{bmatrix}$$

In the above, $(x_d, y_d)$ is coordinates of a point with consideration of distortion in a normalized image coordinate system, $(x, y)$ are ideal coordinates of the point without any distortion, and $k_1$, $k_2$, $k_3$, $p_1$, and $p_2$ are distortion coefficients. For one point $(u_d^D, v_d^D)$ in the coordinate system of the infrared image, normalized coordinates $(x_d^D, y_d^D)$ of the point can be obtained according to an internal parameter of the infrared camera device:

$$x_d^D = (u_d^D - c_x^D)/f_x^D - \alpha * y_d^D$$

$$y_d^D = (v_d^D - c_y^D)/f_y^D$$

In the above, $f_x^D$ and $f_y^D$ are focal lengths of the camera device of the infrared image in the x direction and the y direction, $c_x^D$ and $c_y^D$ are coordinates of a principal point in the x direction and the y direction, and $\alpha$ is the skew factor. Distortion corrected normalized coordinates $(x^D, y^D)$ can be obtained according to the distortion model above. Further, distortion corrected coordinates $(u^D, v^D)$ of the point in the coordinate system of the infrared image can be acquired as below:

$$u^D = f_x^D * x^D + d_x^D$$

$$v^D = f_y^D * y^D + c_y^D$$

In the above, a mapping relationship between the distortion-free coordinates $(u^D, v^D)$ of the point in the coordinate system of the infrared image and coordinates $(X^D, Y^D, Z^D)$ of the point in the three-dimensional coordinate system of the infrared camera device is as below:

$$X^D = (u^D - c_x^D)/f_x^D * Z^D$$

$$Y^D = (v^D - c_y^D)/f_y^D * Z^D$$

In the above, $Z^D$ is the depth value of the point and can be acquired from the depth map.

Further, the point cloud in the three-dimensional coordinate system of the infrared camera device is transformed to a three-dimensional coordinate system of the camera device of the common two-dimensional image. A transformation relationship between corresponding points of the three-dimensional coordinate system of the infrared camera device and the three-dimensional coordinate system of the camera device of the common two-dimensional image is as below:

$$M^{RGB} = [R_{relative} | T_{relative}] M^D$$

In the above, $M^{RGB}$ is coordinates of the point in the three-dimensional coordinate system of the camera device of the common two-dimensional image, $R_{relative}$ is the relative rotation matrix between the two camera devices, $T_{relative}$ is the relative translation matrix between the two camera devices, and $M^D$ is the coordinates of the point in the three-dimensional coordinate system of the infrared camera device.

Further, the point cloud in the three-dimensional coordinate system of the camera device of the common two-dimensional image is projected to a coordinate system of the common two-dimensional image, and distortion of the common two-dimensional camera device is added, wherein the coordinates of the point in the point cloud are $(X^C, Y^C, Z^C)$. $(x^C, y^C)$ are calculated according to equations below:

$$x^C = X^C/Z^C$$

$$y^C = Y^C/Z^C$$

In the above, $x^C$ and $y^C$ are distortion-free coordinates in a normalized coordinate system of the common two-dimensional image, and distortion-containing coordinates $(x_d^C, y_d^C)$ in the normalized coordinate system of the common two-dimensional image can be acquired according to the above distortion model. Thus, the coordinates of the point $(u_d^C, v_d^C)$ in a color image coordinate system are:

$$u_d^C = f_x^C * (x_d^C + \alpha * y_d^C) + c_x^C$$

$$v_d^C = f_y^C * y_d^C + c_y^C$$

In the above, $f_x^C$ and $f_y^C$ are focal lengths of the camera device of the common two-dimensional image in the x direction and the y direction, $c_x^C$ and $c_y^C$ are coordinates of the principal point of the common two-dimensional image in the x direction and the y direction, and $\alpha$ is the skew factor.

Then, distances between all projection points and the corresponding images (the centers of circles or ellipsoids) formed on the common two-dimensional image by the first pattern can be calculated to determine whether calibration needs to be performed again.

On the other hand, the image formed on the common two-dimensional image by the first pattern can be mapped to a three-dimensional coordinate system to form a point cloud and then projected to the infrared image, and a distance between the projection point and a corresponding point of the first pattern in the infrared image is calculated and compared with a first threshold, so as to determine whether calibration needs to be performed again.

More specifically, according to coordinates of an image formed on the common two-dimensional image by the first pattern, the depth value of the first pattern, and a focal length, principal-point coordinates and a skew factor of the first camera device and obtained from calibration, a position of a point cloud in a three-dimensional coordinate system of the first camera device and mapped from the first pattern is calculated, wherein the common two-dimensional image is captured by the first camera device and the infrared image is captured by the second camera device; according to the relative rotation matrix and the relative translation matrix between the first camera device and the second camera device and obtained from calibration, a position of a point cloud in a three-dimensional coordinate system of the second camera device and mapped from the position of the point cloud of the first pattern in the three-dimensional coordinate system of the first camera device is calculated; and according to a focal length, principal-point coordinates and a skew factor of the second camera device and obtained from calibration, a position of a projection in a two-dimensional coordinate system of the common two-dimensional image and mapped from the point cloud of the first pattern in the three-dimensional coordinate system of the first camera device is calculated. Associated details can be referred from the foregoing description and are omitted herein.

The method for verification provided by the present invention can verify a calibration parameter acquired after calibration is performed on a depth camera device, enhancing calibration accuracy.

Figure 5:
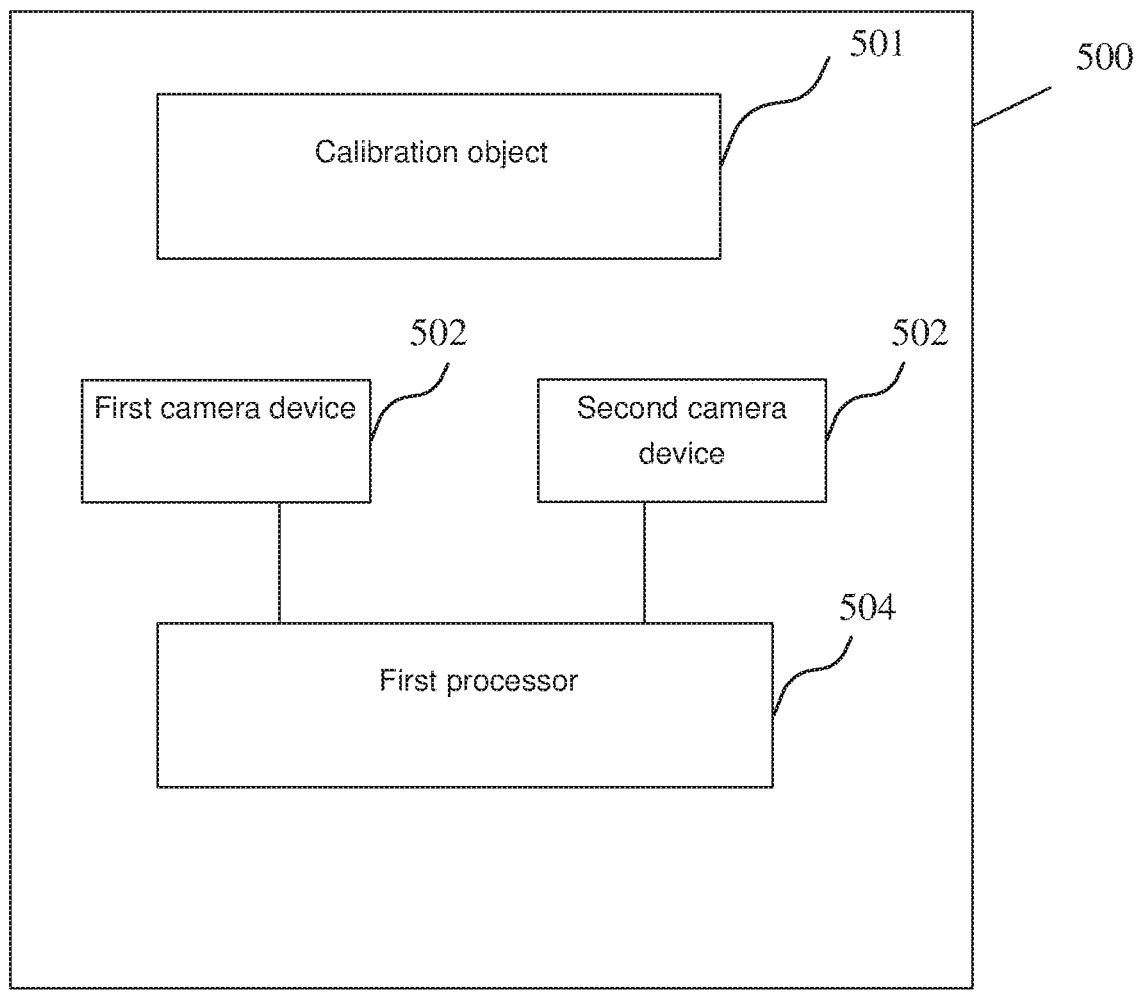
FIG. 5 is a block diagram of a system for verification provided according to a second embodiment of the present invention.

A system 500 for calibration provided according to a second embodiment of the present invention is described in detail with reference to FIG. 5 below. As shown in FIG. 5, the system 500 includes a calibration object 501, a first camera device 502, a second camera device 503 and a first processor 504.

The first camera device 502 is for capturing a common two-dimensional image of the calibration object 501, wherein the calibration object 501 carries a first pattern. The second camera device 503 is for capturing an infrared image of the calibration object 501. The common two-dimensional image includes a black-and-white image or a color image, and the color image may be an RGB image.

The first processor 504 is for calculating a depth map of the calibration object according to the second camera device 503. Selectively, the depth map can be calculated by another different processor. At this point, the first processor is a subordinate description of the processor used for calculation. Selectively, the first processor may calculate the depth map according to a principle different from the depth map, for example, the depth map can be calculated through time-of-flight (TOF) method, structured light or a parallax method.

The first processor 504 is further for: calculating, according to the infrared image, coordinates of an image formed on the infrared image by the first pattern, acquiring a depth value of the first pattern according to a depth map, calculating, according to a parameter obtained from calibration, the coordinates of the image formed on the infrared image by the first pattern, and the depth value of the first pattern, a position of a projection formed on the common two-dimensional image by a three-dimensional point cloud corresponding to the image formed on the infrared image by the first pattern, and calculating a distance between an image and the projection formed on the common two-dimensional image by the first pattern; or, calculating coordinates of an image formed on the common two-dimensional image by the first pattern according to the common two-dimensional image, acquiring the depth value of the first pattern according to the depth map, calculating, according to the parameter obtained from calibration, the coordinates of the image formed on the common two-dimensional image by the first pattern, and the depth value of the first pattern, a position of a projection formed on the infrared image by a three-dimensional point cloud corresponding to the image formed on the common two-dimensional image by the first pattern, and calculating a distance between an image and the projection formed on the infrared image by the first pattern.

The first processor is further for determining a verification result according to the distance and a first threshold. The first threshold may be predetermined. Selectively, an average distance between all projection points and images formed on the infrared image by the first pattern can be calculated. The verification is successful if the average distance is smaller than the predetermined threshold, otherwise calibration needs to be performed again.

Selectively, the common two-dimensional image includes a black-and-white image or a color image, and the color image may be an RGB image.

The first camera device and the second camera device are specifically for simultaneously capturing one common two-dimensional image and one infrared image of the calibration object. It should be noted that, the term "simultaneously" is not strictly the same moment, and may be approximately the same time; that is, compared to the prior art in which a first camera device and a second camera device are required to respectively sequentially capture the calibration object, the first camera device and the second camera device of the present invention are not required to respectively sequentially capture the calibration object, thus enhancing the calibration efficiency.

Selectively, the calibration object includes at least three equal-sized calibration boards, wherein the first patterns carried by the at least three calibration boards are identical. The first pattern includes first circular points or first ellipsoidal points distributed on the calibration board, and a difference between grayscale values of the first circular points or the first ellipsoidal points and a background of the calibration board is greater than a first threshold. Selectively, when the calibration object includes three equal-sized calibration boards, the three equal-sized calibration boards may be arranged at positions forming an upright triangle, that is, one of the three equal-sized calibration boards is arranged right above the middle of the two other calibration boards arranged side by side below. Selectively, the first threshold is 80. For example, the first circular points or the first ellipsoidal points are black with a grayscale value of less than 100, and the background of the calibration board can be white with a grayscale value of more than 180. Selectively, a long side of the calibration board is parallel to the first camera device and the second camera device.

Selectively, the first circular points or the first ellipsoidal points are evenly distributed in rows and columns on the calibration board, as shown in FIG. 2. Selectively, a calibration image on the calibration board may have a frame, which may be black. Selectively, the calibration image has a length of 290 mm and a width of 210 mm. In FIG. 2, the first pattern are small circular points having a diameter of 10 mm, and a distance between the small circular points is 10 mm. The black frame in the calibration image has a width of 10 mm. In the calibration image, there are 13 circular points on the long side, and 9 circular points on the short side.

The calibration object includes four equal-sized calibration boards, which are arranged in two rows and two columns. The descriptive terms relating to positions, such as "parallel" and "middle" are approximate description rather than strict requirements, for example, approximately parallel.

The calibration object carries a pattern indicating a placement direction of the calibration object. The pattern indicating the placement direction of the calibration object may include one of: a first number of second circular points arranged in one row and a second number of second circular points arranged in another row; and the first number of second circular points arranged in one column, and the second number of second circular points arranged in another column; wherein, the second circular points are arranged so as to form a pattern indicating the placement direction of the calibration object. The term "one row" refers to a certain row and does not represent an order in an arrangement. For example, as shown in FIG. 2 or FIG. 3, the term "one row" may be a fourth row from top to bottom in the arrangement, and the term "another row" may be a sixth row from top to bottom in the arrangement. As shown in FIG. 2 or FIG. 3, the second circular points are the large circular points in the drawing, and the large points may have a diameter of 15 mm. Selectively, the pattern indicating the placement direction of the calibration object as arranged by the second circular points may include: an arrow pattern or other equivalent patterns. Through the pattern indicating the placement direction of the calibration object, multiple calibration boards can be placed along the same direction.

The coordinates of the image formed on the infrared image by the first pattern includes coordinates of centers of the first circular points or the first ellipsoidal points in the infrared image; the distance between the image and the projection formed on the common two-dimensional image by the first pattern includes a distance between a position of the projection formed on the common two-dimensional image by the centers of the first circular points or the first ellipsoidal points in the infrared image and a position of the image formed on the common two-dimensional image by the centers of the first circular points or the first ellipsoidal points.

In practice, the system may be a calibration box. In the calibration box, positions of the calibration boards are fixed, and a position for placing a camera device is also fixed.

The first camera device and the second camera device have different fields of view.

Selectively, an image captured by, between the first camera device and the second camera device, the camera device having a greater field of view includes an image of the entire calibration object. The image of the calibration object occupies a middle part of the common two-dimensional image, and occupies more than a first ratio of the common two-dimensional image. The image of the calibration object occupies a middle part of the infrared image, and occupies more than the first ratio of the infrared image. Preferably, the first ratio may be 80%, and the first ratio may be appropriately reduced according to the calibration precision.

Selectively, as shown in FIG. 4, the image of the calibration object occupies more than the first ratio of an image captured by, between the first camera device and the second camera device, the camera device having a smaller field of view. Preferably, the first ratio may be 80%, and the first ratio may be appropriately reduced according to the calibration precision.

Selectively, the coordinates of the first pattern in the common two-dimensional image correspond to the coordinates of the same first pattern in the infrared image. More specifically, a corresponding relationship needs to be established between the coordinates of the first pattern in the common two-dimensional image and the coordinates of the same first pattern in the infrared image. The method for establishing the corresponding relationship may be performed through sorting and storing the sequences of the acquired coordinates of the first pattern in the two types of two-dimensional images.

The first processor is specifically for calculating, according to the coordinates of the image formed on the infrared image by the first pattern, the depth value of the first pattern, and a focal length, principal-point coordinates and a skew factor of the second camera device and obtained from calibration, a position of a point cloud in a three-dimensional coordinate system of the second camera device and mapped from the first pattern, wherein the common two-dimensional image is captured by the first camera device and the infrared image is captured by the second camera device; calculating, according to a relative rotation matrix and a relative translation matrix between the first camera device and the second camera device and obtained from calibration, a position of a point cloud in a three-dimensional coordinate system of the first camera device mapped from the position of the point cloud of the first pattern in the three-dimensional coordinate system of the second camera device; and calculating, according to a focal length, principal-point coordinates and a skew factor of the first camera device and obtained from calibration, a position of a projection in a two-dimensional coordinate system of the common two-dimensional system and mapped from the point cloud of the first pattern in the three-dimensional coordinate system of the first camera device.

More specifically, coordinates of the first pattern detected in the infrared image, that is, centers of circular points or ellipsoidal points, are detected, and depth values of the coordinates of the centers are acquired according to the depth map. The centers are mapped to a three-dimensional coordinate system of the infrared camera device to form a point cloud. Preferably, to form the point cloud, coordinates of a point in the infrared image can be first corrected according to a distortion coefficient of the infrared camera device. In a normalized image coordinate system, a distortion model is as below:

$$r = \sqrt{x^2 + y^2}$$

$$\begin{bmatrix} x_d \\ y_d \end{bmatrix} = (1 + k_1 r^2 + k_2 r^4 + k_3 r^6)\begin{bmatrix} x \\ y \end{bmatrix} + \begin{bmatrix} 2p_1 xy + p_2(r^2 + 2x^2) \\ 2p_2 xy + p_1(r^2 + 2y^2) \end{bmatrix}$$

In the above, $(x_d, y_d)$ is coordinates of a point with consideration of distortion in a normalized image coordinate system, $(x, y)$ are ideal coordinates of the point without any distortion, and $k_1$, $k_2$, $k_3$, $p_1$, and $p_2$ are distortion coefficients. For one point $(u_d^C, v_d^C)$ in the coordinate system of the infrared image, normalized coordinates $(x_d^D, y_d^D)$ of the point can be obtained according to an internal parameter of the infrared camera device:

$$x_d^D = (u_d^D - c_x^D)/f_x^D - \alpha^* y_d^D$$

$$y_d^D = (v_d^D - c_y^D)/f_y^D$$

In the above, $f_x^D$ and $f_y^D$ are focal lengths of the camera device of the infrared image in the x direction and the y direction, $c_y^D$ and $c_x^D$ are coordinates of a principal point in the x direction and the y direction, and $\alpha$ is the skew factor. Distortion corrected normalized coordinates $(x^D, y^D)$ can be obtained according to the distortion model above. Further, distortion corrected coordinates $(u^D, v^D)$ of the point in the coordinate system of the infrared image can be acquired as below:

$$u^D = f_x^D * x^D + c_x^D$$

$$v^D = f_y^D * y^D + c_y^D$$

In the above, a mapping relationship between the distortion-free coordinates ($u^D$, $v^D$) of the point in the coordinate system of the infrared image and coordinates ($X^D$, $Y^D$, $Z^D$) of the point in the three-dimensional coordinate system of the infrared camera device is as below:

$$X^D = (u^D - c_x^D)/f_x^D * Z^D$$

$$Y^D = (v^D - c_y^D)/f_y^D * Z^D$$

In the above, $Z^D$ is the depth value of the point and can be acquired from the depth map.

Further, the point cloud in the three-dimensional coordinate system of the infrared camera device is transformed to a three-dimensional coordinate system of the camera device of the common two-dimensional image. A transformation relationship between corresponding points of the three-dimensional coordinate system of the infrared camera device and the three-dimensional coordinate system of the camera device of the common two-dimensional image is as below:

$$M^{RGB} = [R_{relative} | T_{relative}] M^D$$

In the above, $M^{RGB}$ is coordinates of the point in the three-dimensional coordinate system of the camera device of the common two-dimensional image, $R_{relative}$ is the relative rotation matrix between the two camera devices, $T_{relative}$ is the relative translation matrix between the two camera devices, and $M^D$ is the coordinates of the point in the three-dimensional coordinate system of the infrared camera device.

Further, the point cloud in the three-dimensional coordinate system of the camera device of the common two-dimensional image is projected to a coordinate system of the common two-dimensional image, and distortion of the common two-dimensional camera device is added, wherein the coordinates of the point in the point cloud are ($X^C$, $Y^C$, $Z^C$). ($x^C$, $y^C$) are calculated according to equations below:

$$x^C = X^C/Z^C$$

$$y_C = Y^C/Z^C$$

In the above, $x^C$ and $y^C$ are distortion-free coordinates in a normalized coordinate system of the common two-dimensional image, and distortion-containing coordinates ($x_d^C$, $y_d^C$) in the normalized coordinate system of the common two-dimensional image can be acquired according to the above distortion model. Thus, the coordinates of the point ($u_d^C$, $v_d^C$) in a color image coordinate system are:

$$u_d^C = f_x^C * (x_d^C + \alpha * y_d^C) + c_x^C$$

$$v_d^C = f_y^C * y_d^C + c_y^C$$

In the above, $f_x^C$ and $f_y^C$ are focal lengths of the camera device of the common two-dimensional image in the x direction and the y direction, $c_x^C$ and $c_y^C$ are coordinates of the principal point of the common two-dimensional image in the x direction and the y direction, and $\alpha$ is the skew factor.

Then, distances between all projection points and the corresponding images (the centers of circles or ellipsoids) formed on the common two-dimensional image by the first pattern can be calculated to determine whether calibration needs to be performed again.

On the other hand, the image formed on the common two-dimensional image by the first pattern can be mapped to a three-dimensional coordinate system to form a point cloud and then projected to the infrared image, and a distance between the projection point and a corresponding point of the first pattern in the infrared image is calculated and compared with a first threshold, so as to determine whether calibration needs to be performed again.

The first processor is specifically for: calculating, according to coordinates of an image formed on the common two-dimensional image by the first pattern, the depth value of the first pattern, and a focal length, principal-point coordinates and a skew factor of the first camera device and obtained from calibration, a position of a point cloud in a three-dimensional coordinate system of the first camera device and mapped from the first pattern, wherein the common two-dimensional image is captured by the first camera device and the infrared image is captured by the second camera device; calculating, according to a relative rotation matrix and a relative translation matrix between the first camera device and the second camera device and obtained from calibration, a position of the point cloud in a three-dimensional coordinate system of the second camera device and mapped from the position of the point cloud of the first pattern in the three-dimensional coordinate system of the first camera device; and calculating, according to a focal length, principal-point coordinates and a skew factor of the second camera device and obtained from calibration, a position of a projection in a two-dimensional coordinate system of the common two-dimensional image mapped from the point cloud of the first pattern in the three-dimensional coordinate system of the first camera device. Details of the mapping and calculation can be referred from the foregoing description, and are omitted herein.

The system for verification provided by the present invention can verify a calibration parameter acquired after calibration is performed on a depth camera device, enhancing calibration accuracy.

Figure 6:
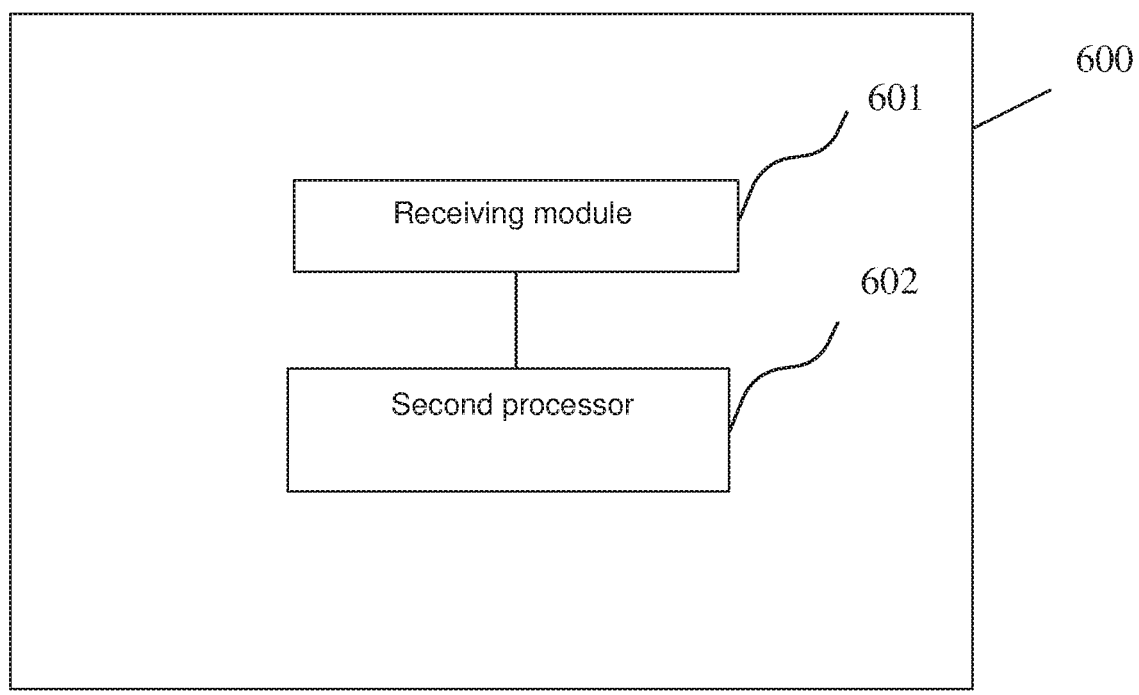
FIG. 6 is a block diagram of a device for verification provided according to a third embodiment of the present invention.

A device 600 for verification provided according to a third embodiment of the present invention is described in detail with reference to FIG. 6 below. As shown in FIG. 6, the device 600 includes a receiving module 601 and a second processor 602.

The receiving module 601 is for acquiring a common two-dimensional image, an infrared image and a depth map of a calibration object, wherein the calibration object carries a first pattern. Selectively, the common two-dimensional image and/or the infrared image may be acquired from a storage device, which may be a RAM or a flash memory. The common two-dimensional image may be captured by a first camera device and the infrared image may be captured by a second camera device. The common two-dimensional image includes a black-and-white image and the color image which may be an RGB image.

The second processor 602 is for: calculating, according to the infrared image, coordinates of an image formed on the infrared image by the first pattern, acquiring a depth value of the first pattern according to a depth map, calculating, according to a parameter obtained from calibration, the coordinates of the image formed on the infrared image by the first pattern, and the depth value of the first pattern, a position of a projection formed on the common two-dimensional image by a three-dimensional point cloud corresponding to the image formed on the infrared image by the first pattern, and calculating a distance between an image and the projection formed on the common two-dimensional image by the first pattern; or, calculating, according to the common two-dimensional image, coordinates of an image formed on the common two-dimensional image by the first pattern, acquiring the depth value of the first pattern according to the depth map, calculating, according to the parameter obtained from calibration, the coordinates of the image formed on the common two-dimensional image by the first pattern, and the depth value of the first pattern, a position of a projection formed on the infrared image by a three-dimensional point cloud corresponding to the image formed on the common two-dimensional image by the first pattern, and calculating a distance between an image and the projection formed on the infrared image by the first pattern.

Selectively, the second processor 602 is for further determining a verification result according to the distance and a first threshold. The first threshold may be predetermined. Selectively, an average distance between all projection points and images formed on the infrared image by the first pattern can be calculated. The verification is successful if the average distance is smaller than the predetermined threshold, otherwise calibration needs to be performed again.

Selectively, the common two-dimensional image includes a black-and-white image or a color image, and the color image may be an RGB image.

The second processor is specially for acquiring one common two-dimensional image and one infrared image of the calibration object simultaneously captured by the first camera device and the second camera device. It should be noted that, the term "simultaneously" is not strictly the same moment, and may be approximately the same time; that is, compared to the prior art in which a first camera device and a second camera device are required to respectively sequentially capture the calibration object, the first camera device and the second camera device of the present invention are not required to respectively sequentially capture the calibration object, thus enhancing the calibration efficiency.

Selectively, the calibration object includes at least three equal-sized calibration boards, wherein the first patterns carried by the at least three calibration boards are identical. The first pattern includes first circular points or first ellipsoidal points distributed on the calibration board, and a difference between grayscale values of the first circular points or the first ellipsoidal points and a background of the calibration board is greater than a first threshold. Selectively, when the calibration object includes three equal-sized calibration boards, the three equal-sized calibration boards may be arranged at positions forming an upright triangle, that is, one of the three equal-sized calibration boards is arranged right above the middle of the two other calibration boards arranged side by side below. Selectively, the first threshold is 80. For example, the first circular points or the first ellipsoidal points are black with a grayscale value of less than 100, and the background of the calibration board can be white with a grayscale value of more than 180. Selectively, a long side of the calibration board is parallel to the first camera device and the second camera device.

Selectively, the first circular points or the first ellipsoidal points are evenly distributed in rows and columns on the calibration board, as shown in FIG. 2. Selectively, a calibration image of on the calibration board may have a frame, which may be black. Selectively, the calibration image has a length of 290 mm and a width of 210 mm. In FIG. 2, the first pattern are small circular points having a diameter of 10 mm, and a distance between the small circular points is 10 mm. The black frame in the calibration image has a width of 10 mm. In the calibration image, there are 13 circular points on the long side, and 9 circular points on the short side.

The calibration object includes four equal-sized calibration boards, which are arranged in two rows and two columns. The descriptive terms relating to positions, such as "parallel" and "middle" are approximate description rather than strict requirements, for example, approximately parallel.

The calibration object carries a pattern indicating a placement direction of the calibration object. The pattern indicating the placement direction of the calibration object may include one of: a first number of second circular points arranged in one row and a second number of second circular points arranged in another row; and the first number of second circular points arranged in one column, and the second number of second circular points arranged in another column; wherein, the second circular points are arranged so as to form a pattern indicating the placement direction of the calibration object. The term "one row" refers to a certain row and does not represent an order in an arrangement. For example, as shown in FIG. 2 or FIG. 3, the term "one row" may be a fourth row from top to bottom in the arrangement, and the term "another row" may be a sixth row from top to bottom in the arrangement. As shown in FIG. 2 or FIG. 3, the second circular points are the large circular points in the drawing, and the large circular points may have a diameter of 15 mm. Selectively, the pattern indicating the placement direction of the calibration object as arranged by the second circular points may include: an arrow pattern or other equivalent patterns. Through the pattern indicating the placement direction of the calibration object, multiple calibration boards can be placed along the same direction.

The coordinates of the image formed on the infrared image by the first pattern includes coordinates of centers of the first circular points or the first ellipsoidal points in the infrared image; the distance between the image and the projection formed on the common two-dimensional image by the first pattern includes a distance between a position of the projection formed on the common two-dimensional image by the centers of the first circular points or the first ellipsoidal points in the infrared image and a position of the image formed on the common two-dimensional image by the centers of the first circular points or the first ellipsoidal points.

The first camera device and the second camera device have different fields of view.

Selectively, an image captured by, between the first camera device and the second camera device, the camera device having a greater field of view includes an image of the entire calibration object. The image of the calibration object occupies a middle part of the common two-dimensional image, and occupies more than a first ratio of the common two-dimensional image. The image of the calibration object occupies a middle part of the infrared image, and occupies more than the first ratio of the infrared image. Preferably, the first ratio may be 80%, and the first ratio may be appropriately reduced according to the calibration precision.

Selectively, as shown in FIG. 4, the image of the calibration object occupies more than the first ratio of an image captured by, between the first camera device and the second camera device, the camera device having a smaller field of view. Preferably, the first ratio may be 80%, and the first ratio may be appropriately reduced according to the calibration precision.

Selectively, the coordinates of the first pattern in the common two-dimensional image correspond to the coordinates of the same first pattern in the infrared image. More specifically, a corresponding relationship needs to be established between the coordinates of the same first pattern in the common two-dimensional image and the coordinates of the first pattern in the infrared image. The method for establishing the corresponding relationship may be performed through sorting and storing the sequences of the acquired coordinates of the first pattern in the two types of two-dimensional images.

The second processor is specifically for: calculating, according to the coordinates of the image formed on the infrared image by the first pattern, the depth value of the first pattern, and a focal length, principal-point coordinates and a skew factor of the second camera device and obtained from calibration, a position of a point cloud in a three-dimensional coordinate system of the second camera device and mapped from the first pattern, wherein the common two-dimensional image is captured by the first camera device and the infrared image is captured by the second camera device; calculating, according to a relative rotation matrix and a relative translation matrix between the first camera device and the second camera device and obtained from calibration, a position of a point cloud in a three-dimensional coordinate system of the first camera device and mapped from the position of the point cloud of the first pattern in the three-dimensional coordinate system of the second camera device; and calculating, according to a focal length, principal-point coordinates and a skew factor of the first camera device and obtained from calibration, a position of a projection in a two-dimensional coordinate system of the common two-dimensional system and mapped from the point cloud of the first pattern in the three-dimensional coordinate system of the first camera device.

More specifically, coordinates of the first pattern detected in the infrared image, that is, centers of circular points or ellipsoidal points, are detected, and depth values of the coordinates of the centers are acquired according to the depth map. The centers are mapped to a three-dimensional coordinate system of the infrared camera device to form a point cloud. Preferably, to form the point cloud, the coordinates of a point in the infrared image can be first corrected according to a distortion coefficient of the infrared camera device. In a normalized image coordinate system, a distortion model is as below:

$$r = \sqrt{x^2 + y^2}$$

$$\begin{bmatrix} x_d \\ y_d \end{bmatrix} = (1 + k_1 r^2 + k_2 r^4 + k_3 r^6)\begin{bmatrix} x \\ y \end{bmatrix} + \begin{bmatrix} 2p_1 xy + p_2(r^2 + 2x^2) \\ 2p_2 xy + p_1(r^2 + 2y^2) \end{bmatrix}$$

In the above, $(x_d, y_d)$ is coordinates of a point with consideration of distortion in a normalized image coordinate system, $(x, y)$ are ideal coordinates of the point without any distortion, and $k_1, k_2, k_3, p_1,$ and $p_2$ are distortion coefficients. For one point $(u_d^D, v_d^D)$ in the coordinate system of the infrared image, normalized coordinates $(x_d^D, y_d^D)$ of the point can be obtained according to an internal parameter of the infrared camera device:

$$x_d^D = (u_d^D - c_x^D)/f_x^D - \alpha * y_d^D$$

$$y_d^D = (v_d^D - c_y^D)/f_y^D$$

In the above, $f_x^D$ and $f_y^D$ are focal lengths of the camera device of the infrared image in the x direction and the y direction, $c_y^D$ and $c_x^D$ are coordinates of a principal point of the infrared image in the x direction and the y direction, and $\alpha$ is the skew factor. Distortion corrected normalized coordinates $(x^D, y^D)$ can be obtained according to the distortion model above. Further, distortion corrected coordinates $(u^D, v^D)$ of the point in the coordinate system of the infrared image can be acquired as below:

$$u^D = f_x^D * x^D + d_x^D$$

$$v^D = f_y^D * y^D + c_y^D$$

In the above, a mapping relationship between the distortion-free coordinates $(u^D, v^D)$ of the point in the coordinate system of the infrared image and coordinates $(X^D, Y^D, Z^D)$ of the point in the three-dimensional coordinate system of the infrared camera device is as below:

$$X^D = (u^D - c_x^D)/f_x^D * Z^D$$

$$Y^D = (v^D - c_y^D)/f_y^D * Z^D$$

In the above, $Z^D$ is the depth value of the point and can be acquired from the depth map.

Further, the point cloud in the three-dimensional coordinate system of the infrared camera device is transformed to a three-dimensional coordinate system of the camera device of the common two-dimensional image. A transformation relationship between corresponding points of the three-dimensional coordinate system of the infrared camera device and the three-dimensional coordinate system of the camera device of the common two-dimensional image is as below:

$$M^{RGB} = [R_{relative} | T_{relative}] M^D$$

In the above, $M^{RGB}$ is coordinates of the point in the three-dimensional coordinate system of the camera device of the common two-dimensional image, $R_{relative}$ is the relative rotation matrix between the two camera devices, $T_{relative}$ is the relative translation matrix between the two camera devices, and $M^D$ is the coordinates of the point in the three-dimensional coordinate system of the infrared camera device.

Further, the point cloud in the three-dimensional coordinate system of the camera device of the common two-dimensional image is projected to a coordinate system of the common two-dimensional image, and distortion of the common two-dimensional camera device is added, wherein the coordinates of the point in the point cloud are $(X^C, Y^C, Z^C)$.

$(x^C, y^C)$ are calculated according to equations below:

$$x^C = X^C/Z^C$$

$$y^C = Y^C/Z^C$$

In the above, $x^C$ and $y^C$ are distortion-free coordinates in a normalized coordinate system of the common two-dimensional image, and distortion-containing coordinates $(x_d^C, y_d^C)$ in the normalized coordinate system of the common two-dimensional image can be acquired according to the above distortion model. Thus, the coordinates of the point $(u_d^C, v_d^C)$ in a color image coordinate system are:

$$u_d^C = f_x^C * (x_d^C + \alpha * y_d^C) + c_x^C$$

$$v_d^C = f_y^C * y_d^C + c_y^C$$

In the above, $f_x^C$ and $f_y^C$ are focal lengths of the camera device of the common two-dimensional image in the x direction and the y direction, $c_x^C$ and $c_y^C$ are coordinates of the principal point of the common two-dimensional image in the x direction and the y direction, and $\alpha$ is the skew factor.

Then, distances between all projection points and the corresponding images (the centers of circles or ellipsoids) formed on the common two-dimensional image by the first pattern can be calculated to determine whether calibration needs to be performed again.

On the other hand, the image formed on the common two-dimensional image by the first pattern can be mapped to a three-dimensional coordinate system to form a point cloud and then projected to the infrared image, and a distance between the projection point and a corresponding point of the first pattern in the infrared image is calculated and compared with a first threshold, so as to determine whether calibration needs to be performed again.

The second processor is further for: calculating, according to the coordinates of the image formed on the common two-dimensional image by the first pattern, the depth value of the first pattern, and the focal length, the principal-point coordinates and the skew factor of the first camera device and obtained from calibration, the position of the point cloud in the three-dimensional coordinate system of the first camera device and mapped from the first pattern, wherein the common two-dimensional image is captured by the first camera device and the infrared image is captured by the second camera device; calculating, according to the relative rotation matrix and the relative translation matrix between the first camera device and the second camera device and obtained from calibration, the position of the point cloud in the three-dimensional coordinate system of the second camera device and mapped from the position of the point cloud of the first pattern in the three-dimensional coordinate system of the first camera device; and calculating, according to the focal length, the principal-point coordinates and the skew factor of the second camera device and obtained from calibration, the position of the projection in the two-dimensional coordinate system of the common two-dimensional image and mapped from the point cloud of the first pattern in the three-dimensional coordinate system of the first camera device.

The system for verification provided by the present invention can verify a calibration parameter acquired after calibration is performed on a depth camera device, enhancing calibration accuracy.

Figure 7:
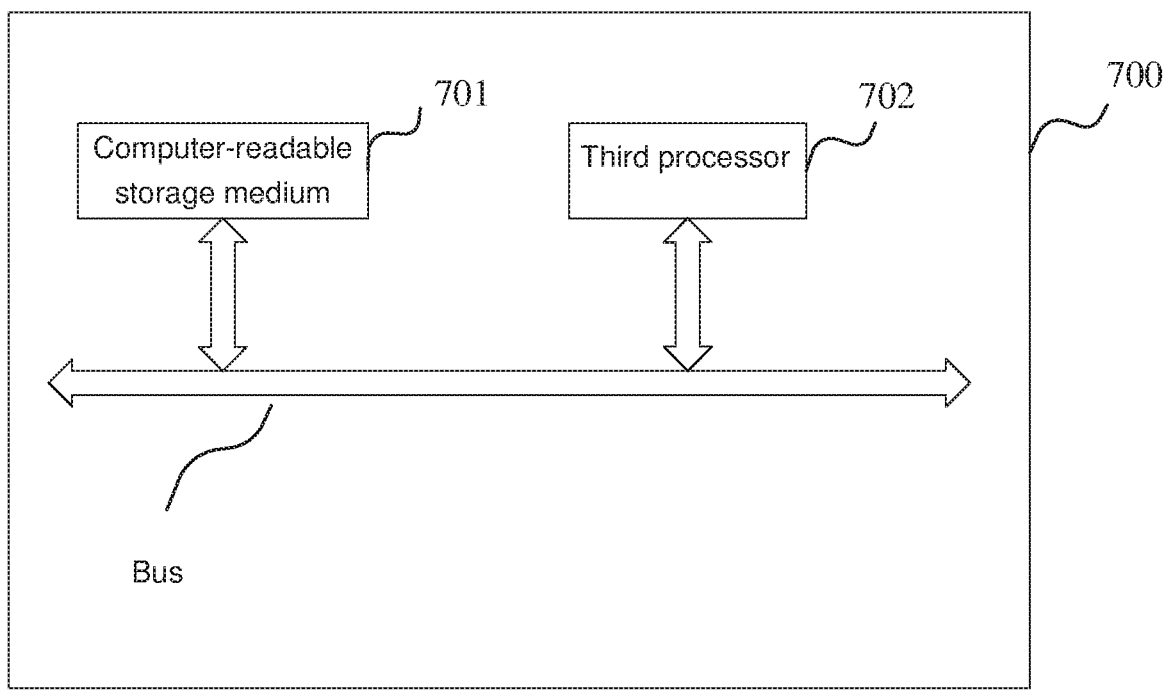
FIG. 7 is a block diagram of a device for verification provided according to a fourth embodiment of the present invention.

A device 700 for verification provided according to a fourth embodiment of the present invention is described in detail with reference to FIG. 7 below. The device 700 includes a computer-readable storage medium 701. The computer-readable storage medium 701 stores a computer program, which realizes the steps of the method of the first embodiment when executed by a third processor 702. As shown in FIG. 7, selectively, the device 700 may include a bus.

Details of function components of this embodiment can be referred from the description associated with the third embodiment.

The system for verification provided by the present invention can verify a calibration parameter acquired after calibration is performed on a depth camera device, enhancing calibration accuracy.

Figure 8:
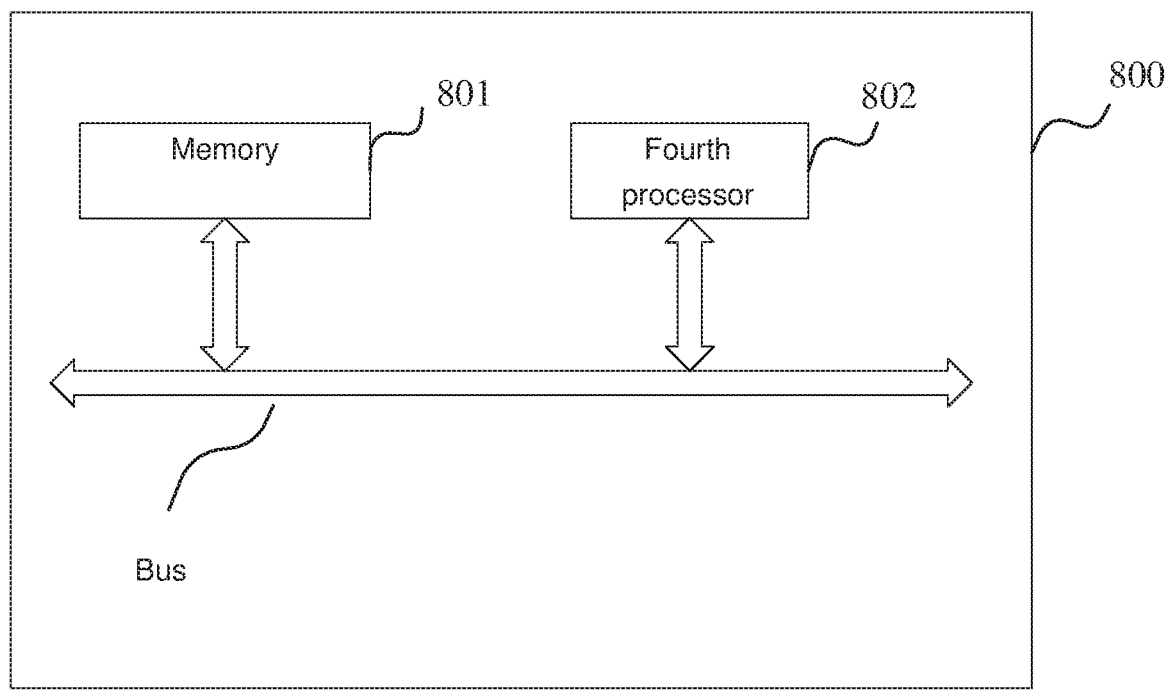
FIG. 8 is a block diagram of a device for verification provided according to a fifth embodiment of the present invention.

A device 800 for calibration provided according to a fifth embodiment of the present invention is described in detail with reference to FIG. 8 below. The device 800 includes a memory 801, a fourth processor 802, and a computer program that is stored in the memory 801 and can be run in the fourth processor 802. The computer program realizes the steps of the method of the first embodiment when executed by the fourth processor 802. Selectively, as shown, the device 800 further includes a bus.

The system for verification provided by the present invention can verify a calibration parameter acquired after calibration is performed on a depth camera device, enhancing calibration accuracy.

For example, the computer program can be divided into one or multiple modules/units, wherein the one or multiple modules/units are stored in the memory and are executed by the processor to complete the present invention. The one or more modules/units can be a series of computer instruction segments capable of accomplishing a predetermined function, and the instruction segments are for describing an execution process of the computer program in the device/terminal apparatus.

The device/terminal apparatus may be computer apparatuses such as a cell phone, a tablet computer, a desktop computer, a notebook, a palm computer and a cloud server. The device/terminal apparatus may include, for example but not limited to, a processor and a memory. A person skilled in the art can understand that, the illustrative drawings of the present invention are examples of a device/terminal apparatus and are not to be interpreted as limitations to the device/terminal apparatus; more or less components than those shown in the drawings, or a combination of certain components or different components shown in the drawings may be included, for example, the device/terminal apparatus may further include such as an input/output device, a network access device and a bus.

The processor may be a central processing unit (CPU), a general-purpose processor, a digital signal processor (DSP), an application-specific integrated circuit (ASIC), a field-programmable gate array (FPGA), other programmable logic gate devices, a discrete gate or transistor logic device, or discrete hardware component. The general-purpose processor may be a microprocessor or may be any conventional processor. The processor is a control center of the device/terminal apparatus, and uses various interfaces and wires to connect various parts of the entire device/terminal apparatus.

The memory can be used for storing a computer program and/or a module. The processor realizes various functions of the device/terminal apparatus by running or executing the computer program and/or module stored in the memory and invoking data stored in the memory. The memory may include a program storage region and a data storage region. The program storage region may store an operating system or an application needed by at least one function (e.g., an image playback function). The data storage region may store user-established data (e.g., video data and images) for a cell phone. Further, the memory may include a high-speed RAM, or a non-volatile memory, e.g., a hard drive, a memory, a pluggable hard drive, a smart media card (SMC), a Secure Digital (SD) card, a flash card, at least one disk storage device, a flash memory device, or other volatile memory device.

When the modules/units integrated in the device/terminal apparatus are implemented in form of software function units and made as an independent product for sale and use, the modules/units in form of software function units may be stored in a computer-readable storage medium. On the basis of such understanding, all or a part of the method of the above embodiments of the present invention can be realized, or be completed by associated hardware through an instruction of a computer program. The computer program may be stored in a computer-readable storage medium and can accomplish the above steps when executed by a processor. The computer program includes a computer program code, which may be in form of a source code, an object code, an executable file or some intermediate forms. The computer-readable storage medium may include: any entity or device, recording medium, U-drive, mobile drive, magnetic drive, optic disk, computer memory, read-only memory (ROM), random access memory (RAM), electrical carrier signals, telecommunication signals or software distribution medium capable of carrying the computer program code.

The image of the target object in the foregoing embodiments may be a partial image of the target object or an entire imaging of the target object. For both a partial image and an entire image, any modifications correspondingly made to the partial image and entire image are applicable to the method or device provided by the present invention. The above modifications can be made by a person skilled in the art without involving inventive skills and are thus encompassed within the protection scope of the present invention.

What is claimed is:

1. A method for verification, characterized by, the method comprising:
   acquiring a common two-dimensional image, an infrared image and a depth map of a calibration object, wherein the calibration object carries a first pattern; and
   (1) according to the infrared image, calculating coordinates of an image formed on the infrared image by the first pattern, (2) according to the depth map, acquiring a depth value of the first pattern, (3) according to a parameter obtained from calibration, the coordinates of the image formed on the infrared image by the first pattern, and the depth value of the first pattern, calculating a position of a projection formed on the common two-dimensional image by a three-dimensional point cloud corresponding to the image formed on the infrared image by the first pattern, and (4) calculating a distance between an image formed on the common two-dimensional image by the first pattern and the projection of the three-dimensional point cloud on the common two-dimensional image; or
   (a) according to the common two-dimensional image, calculating coordinates of an image formed on the common two-dimensional image by the first pattern, (b) according to the depth map, acquiring a depth value of the first pattern, (c) calculating a position of a projection formed on the infrared image by a three-dimensional point cloud corresponding to the image formed on the common two-dimensional image by the first pattern, and (d) calculating a distance between an image formed on the infrared image by the first pattern and the projection of the three-dimensional cloud point on the infrared image.

2. The method according to claim 1, characterized by, the method further comprising:
   determining a verification result according to the distance and a first threshold.

3. The method according to claim 1, characterized in that:
   the calibration object comprises at least three equal-sized calibration boards, wherein the first patterns carried by the at least three calibration boards are identical; and
   the first pattern comprises first circular points or first ellipsoidal points distributed on the calibration board, and a difference between grayscale values of the first circular points or the first ellipsoidal points and a background of the calibration board is greater than the first threshold.

4. The method according to claim 3, characterized in that:
   the first circular points or the first ellipsoidal points are evenly distributed in rows and columns on the calibration board.

5. The method according to claim 3, characterized in that:
   the coordinates of the image formed on the infrared image by the first pattern comprise: coordinates of centers of the first circular points or the first ellipsoidal points in the infrared image; and
   the distance between the image formed on the common two-dimensional image by the first pattern and the projection of the three-dimensional cloud point on the common two-dimensional image comprises: a distance between a position of a projection formed on the common two-dimensional image by the centers of the first circular points or the first ellipsoidal points in the infrared image and a position of an image formed on the common two-dimensional image by the centers of the first circular points or the first ellipsoidal points.

6. The method according to claim 1, characterized in that:
   the coordinates of the first pattern in the common two-dimensional image correspond to coordinates of the same first pattern in the infrared image.

7. The method according to claim 3, characterized in that:
   the calibration object comprises four equal-sized calibration boards, wherein the four calibration boards are arranged in two rows and two columns.

8. The method according to claim 1, characterized in that:
   the calibration object carries a pattern indicating a placement direction of the calibration object.

9. The method according to claim 8, characterized that:
   the pattern indicating the placement direction of the calibration object comprises one of: a first number of second circular points arranged in one row and a second number of second circular points arranged in another row; and the first number of second circular points arranged in one column, and the second number of second circular points arranged in another column;
   wherein, the second circular points are arranged to form a pattern indicating the placement direction of the calibration object.

10. The method according to claim 1, characterized in that:
    the common two-dimensional image is captured by a first camera device, the infrared image is captured by a second camera device, and the first camera device and the second camera device have different fields of view.

11. The method according to claim 10, characterized in that:
    an image captured by one of the first camera device and the second camera device having a greater field of view includes an image of the entire calibration object;
    the image of the calibration object occupies a middle part of the common two-dimensional image, and occupies more than a first ratio of the common two-dimensional image; and
    the image of the calibration object occupies a middle part of the infrared image, and occupies more than the first ratio of the infrared image.

12. The method according to claim 11, characterized in that:
    the first ratio is 80%.

13. The method according to claim 1, characterized in that:
    the step of acquiring the common two-dimensional image and the infrared image of the calibration object comprises simultaneously capturing one common two-dimensional image and one infrared image of the calibration object.

14. The method according to claim 1, characterized in that, the step of calculating, according to the parameter obtained from calibration, the coordinates of the image formed on the infrared image by the first pattern, and the depth value of the first pattern, the position of the projection formed on the common two-dimensional image by the three-dimensional point cloud corresponding to the image formed on the infrared image by the first pattern comprises:
    according to (1) the coordinates of the image formed on the infrared image by the first pattern, (2) the depth value of the first pattern, and (3) a second camera device's a focal length, principal-point coordinates, and a skew factor obtained from calibration, calculating a position of a point cloud that projects the first pattern to a three-dimensional coordinate system of the second camera device, wherein the common two-dimensional image is captured by a first camera device and the infrared image is captured by the second camera device;

according to a relative rotation matrix and a relative translation matrix between the first camera device and the second camera device that are obtained from calibration and the position of the point cloud of the first pattern in the three-dimensional coordinate system of the second camera device, calculating a position of a point cloud that projects the first pattern to a three-dimensional coordinate system of the first camera device; and according to a focal length, principal-point coordinates, a skew factor of the first camera device obtained from calibration, and the position of the point cloud of the first pattern in the three-dimensional coordinate system of the first camera device, calculating a position of a point cloud that projects the first pattern to a two-dimensional coordinate system of the common two-dimensional image.

15. The method according to claim 1, characterized in that, the step of calculating, according to the parameter obtained from calibration, the coordinates of the image formed on the common two-dimensional image by the first pattern, and the depth value of the first pattern, the position of the projection formed on the infrared image by the three-dimensional point cloud corresponding to the image formed on the common two-dimensional image by the first pattern comprises:

according to the coordinates of the image formed on the common two-dimensional image by the first pattern, the depth value of the first pattern, and the focal length, the principal-point coordinates and the skew factor of the first camera device that are obtained from calibration, calculating a position of a point cloud that projects the first pattern to a three-dimensional coordinate system of the second camera device, wherein the common two-dimensional image is captured by the first camera device and the infrared image is captured by the second camera device;

according to the relative rotation matrix and the relative translation matrix between the first camera device and the second camera device that are obtained from calibration and the position of the point cloud of the first pattern in the three-dimensional coordinate system of the second camera device, calculating a position of a point cloud that projects the first pattern to a three-dimensional coordinate system of the first camera device; and according to the focal length, the principal-point coordinates and the skew factor of the second camera device that are obtained from calibration and the position of the point cloud of the first pattern in the three-dimensional coordinate system of the first camera device, calculating a position of a point cloud that projects the first pattern to a two-dimensional coordinate system of the common two-dimensional image.

16. The method according to claim 1, characterized in that:

the common two-dimensional image comprises a black-and-white image or a color image.

17. A system for verification, characterized by, the system comprising a calibration object, a first camera device, a second camera device, and a processor;

the first camera device, for capturing a common two-dimensional image of the calibration object, wherein the calibration object carries a first pattern;

the second camera device, for capturing an infrared image of the calibration object;

the processor, for calculating a depth map of the calibration object according to the second camera device; and the processor, further for calculating, according to the infrared image, coordinates of an image formed on the infrared image by the first pattern, acquiring a depth value of the first pattern according to the depth map, calculating, according to a parameter obtained from calibration, the coordinates of the image formed on the infrared image by the first pattern, and the depth value of the first pattern, a position of a projection formed on the common two-dimensional image by a three-dimensional point cloud corresponding to the image formed on the infrared image by the first pattern, and calculating a distance between an image and the projection formed on the common two-dimensional image by the first pattern; or calculating, according to the common two-dimensional image, coordinates of an image formed on the common two-dimensional image by the first pattern, acquiring the depth value of the first pattern according to the depth map, calculating, according to a parameter obtained from calibration, the coordinates of the image formed on the common two dimensional image by the first pattern, and the depth value of the first pattern, a position of a projection formed on the infrared image by a three-dimensional point cloud corresponding to the image formed on the common two-dimensional image by the first pattern, and calculating a distance between an image and the projection formed on the infrared image by the first pattern.

18. A device for verification, characterized by, the device comprising:

a receiving module, for acquiring a common two-dimensional image, an infrared image and a depth map of a calibration object, wherein the calibration object carries a first pattern; and a processor, for calculating, according to the infrared image, coordinates of an image formed on the infrared image by the first pattern, acquiring a depth value of the first pattern according to the depth map, calculating, according to a parameter obtained from calibration, the coordinates of the image formed on the infrared image by the first pattern, and the depth value of the first pattern, a position of a projection formed on the common two-dimensional image by a three-dimensional point cloud corresponding to the image formed on the infrared image by the first pattern, and calculating a distance between an image and the projection formed on the common two-dimensional image by the first pattern; or calculating, according to the common two-dimensional image, coordinates of an image formed on the common two-dimensional image by the first pattern, acquiring a depth value of the first pattern according to the depth map, calculating, according to a parameter obtained from calibration, the coordinates of the image formed on the common two-dimensional image by the first pattern, and the depth value of the first pattern, a position of a projection formed on the infrared image by a three-dimensional point cloud corresponding to the image formed on the common two-dimensional image by the first pattern, and calculating a distance between an image and the projection formed on the infrared image by the first pattern.

19. A non-transitory computer-readable storage medium, storing a computer program, wherein the computer program is executed by a processor for:

acquiring a common two-dimensional image, an infrared image and a depth map of a calibration object, wherein the calibration object carries a first pattern; and (1) according to the infrared image, calculating coordinates of an image formed on the infrared image by the first pattern, (2) according to the depth map, acquiring a depth value of the first pattern, (3) according to a parameter obtained from calibration, the coordinates of the image formed on the infrared image by the first pattern, and the depth value of the first pattern, calculating a position of a projection formed on the common two-dimensional image by a three-dimensional point cloud corresponding to the image formed on the infrared image by the first pattern, and (4) calculating a distance between an image formed on the common two-dimensional image by the first pattern and the projection of the three-dimensional point cloud on the common two-dimensional image; or (a) according to the common two-dimensional image, calculating coordinates of an image formed on the common two-dimensional image by the first pattern, (b) according to the depth map, acquiring a depth value of the first pattern, (c) calculating a position of a projection formed on the infrared image by a three-dimensional point cloud corresponding to the image formed on the common two-dimensional image by the first pattern, and (d) calculating a distance between an image formed on the infrared image by the first pattern and the projection of the three-dimensional cloud point on the infrared image.

20. A device for verification, comprising a memory, a processor, and a computer program stored in the memory and operable to be run in the processor, wherein the processor executes the computer program for acquiring a common two-dimensional image, an infrared image and a depth map of a calibration object, wherein the calibration object carries a first pattern; and (1) according to the infrared image, calculating coordinates of an image formed on the infrared image by the first pattern, (2) according to the depth map, acquiring a depth value of the first pattern, (3) according to a parameter obtained from calibration, the coordinates of the image formed on the infrared image by the first pattern, and the depth value of the first pattern, calculating a position of a projection formed on the common two-dimensional image by a three-dimensional point cloud corresponding to the image formed on the infrared image by the first pattern, and (4) calculating a distance between an image formed on the common two-dimensional image by the first pattern and the projection of the three-dimensional point cloud on the common two-dimensional image; or (a) according to the common two-dimensional image, calculating coordinates of an image formed on the common two-dimensional image by the first pattern, (b) according to the depth map, acquiring a depth value of the first pattern, (c) calculating a position of a projection formed on the infrared image by a three-dimensional point cloud corresponding to the image formed on the common two-dimensional image by the first pattern, and (d) calculating a distance between an image formed on the infrared image by the first pattern and the projection of the three-dimensional cloud point on the infrared image.

\* \* \* \* \*